(12) United States Patent
Olsson et al.

(10) Patent No.: US 10,989,830 B1
(45) Date of Patent: Apr. 27, 2021

(54) UTILITY LOCATOR APPARATUS AND SYSTEMS

(71) Applicant: SeeScan, Inc., San Diego, CA (US)

(72) Inventors: Mark S. Olsson, La Jolla, CA (US); Ray Merewether, La Jolla, CA (US); Michael J. Martin, San Diego, CA (US); Ryan B. Levin, San Diego, CA (US)

(73) Assignee: SEESCAN, INC., San Diego, CA (US)

( * ) Notice: Subject to any disclaimer, the term of this patent is extended or adjusted under 35 U.S.C. 154(b) by 470 days.

(21) Appl. No.: 16/036,713

(22) Filed: Jul. 16, 2018

Related U.S. Application Data

(63) Continuation of application No. 15/339,766, filed on Oct. 31, 2016, now Pat. No. 10,031,253, which is a continuation of application No. 13/850,181, filed on Mar. 25, 2013, now Pat. No. 9,488,747.

(60) Provisional application No. 61/779,830, filed on Mar. 13, 2013, provisional application No. 61/614,829, filed on Mar. 23, 2012.

(51) Int. Cl.
| | |
|---|---|
| *G01V 3/08* | (2006.01) |
| *G01V 3/10* | (2006.01) |
| *G01V 3/12* | (2006.01) |
| *G01V 3/15* | (2006.01) |
| *G01V 3/165* | (2006.01) |
| *G01V 3/17* | (2006.01) |

(52) U.S. Cl.
CPC ............... *G01V 3/104* (2013.01); *G01V 3/12* (2013.01); *G01V 3/15* (2013.01); *G01V 3/165* (2013.01); *G01V 3/08* (2013.01); *G01V 3/10* (2013.01); *G01V 3/17* (2013.01)

(58) Field of Classification Search
CPC ... G01V 3/10; G01V 3/08; G01V 3/15; G01V 3/12; G01V 3/17
See application file for complete search history.

(56) References Cited

U.S. PATENT DOCUMENTS

| | | | |
|---|---|---|---|
| 4,600,884 | A | 7/1986 | Hara |
| 6,541,966 | B1 | 4/2003 | Keene |
| 7,009,399 | B2 | 3/2006 | Olsson et al. |
| 7,443,154 | B1 | 10/2008 | Merewether et al. |
| 7,518,374 | B1 | 4/2009 | Olsson et al. |
| 7,619,516 | B2 | 11/2009 | Olsson et al. |
| 9,927,545 | B2 * | 3/2018 | Olsson .................... G01V 3/08 |

(Continued)

FOREIGN PATENT DOCUMENTS

CA 2178332 A1 4/1996

OTHER PUBLICATIONS

Dickinson, Dustin R., Non-Final Office Action (dated Jul. 13, 2015), regarding Quad-Gradient Coils for Use in Locating Systems, U.S. Appl. No. 13/676,989, U.S. Patent and Trademark Office, USA.

(Continued)

*Primary Examiner* — Joseph J Lauture
(74) *Attorney, Agent, or Firm* — Steven C. Tietsworth, Esq.; Michael J. Pennington, Esq.

(57) ABSTRACT

Buried object locators including an omnidirectional antenna array and a gradient antenna array are disclosed. A locator display may include information associated with a buried object determined based on processing of both omnidirectional antenna array signals and gradient antenna array signals.

4 Claims, 31 Drawing Sheets

(56) References Cited

U.S. PATENT DOCUMENTS

2005/0189939 A1    9/2005   Obama et al.
2010/0219823 A1    9/2010   Gogolla et al.

OTHER PUBLICATIONS

International Searching Authority, "Written Opinion of the International Searching Authority" for PCT Patent Application No. PCT/US2013/033730, dated Sep. 24, 2014, European Patent Office, Munich.
RIDGID, "SeekTech SR-20 Pipe, Cable and Sonde Locator," RIDGID Operator's Manual, Emerson Professional Tools, Elyria, OH.
RIDGID, "SeekTech SR-60 Pipe, Cable and Sonde Locator," RIDGID Operator's Manual, Emerson Professional Tools, Elyria, OH.
Vivax-Metrotech, "Locate Buried Utilities with Speed, Accuracy and Confidence! Using Vivax-Metrotech Buried Pipe and Cable Locators," Ad for VM-810 Receiver and vLocPro2 Receiver, Vivax-Metrotech Corporation, Santa Clara, CA.

\* cited by examiner

Top View of Example Embodiment of Quad Gradient Antenna Node
Configuration

Top View of Example Embodiment of Quad Gradient Antenna Node Configuration

Top View of Example Embodiment of Quad
Gradient Antenna Array Configuration Using
Optional Dummy Coils Top View of Alternate Example Embodiment of
Quad Gradient Antenna Array Configuration
Using Optional Dummy Coils

UTILITY LOCATOR APPARATUS AND SYSTEMS

CROSS-REFERENCE TO RELATED APPLICATIONS

This application is a continuation of and claims priority to co-pending U.S. Utility patent application Ser. No. 15/339,766, entitled GRADIENT ANTENNA COILS AND ARRAYS FOR USE IN LOCATING SYSTEMS, filed Oct. 31, 2016, which claims priority to U.S. Utility patent application Ser. No. 13/850,181, now U.S. Pat. No. 9,488,747, entitled GRADIENT ANTENNA COILS AND ARRAYS FOR USE IN LOCATING SYSTEMS, filed Mar. 25, 2013, which claims priority under 35 U.S.C. § 119(e) to U.S. Provisional Patent Application Ser. No. 61/614,829, filed Mar. 23, 2012, entitled QUAD-GRADIENT COILS FOR USE IN LOCATING SYSTEMS, and to U.S.

Provisional Patent Application Ser. No. 61/779,830, filed Mar. 13, 2013, entitled GRADIENT ANTENNA COILS AND ARRAYS FOR USE IN LOCATING SYSTEMS. The content of each of these applications is incorporated by reference herein in its entirety for all purposes.

FIELD

This disclosure relates generally to locating systems used to detect buried or hidden objects, such as pipes, cables, conduits, or other objects that are buried or obscured or hidden from sight. More specifically, but not exclusively, the disclosure relates to magnetic field antenna arrays including gradient antenna coils and arrays and related electronic hardware, software, and signal processing methods of use within such locating systems.

BACKGROUND

Locator systems for detecting objects that are buried or obscured from plain sight are known in the art. Many current antenna arrays are costly to both the manufacturer and the customer, are unduly complex in configuration, and have variable sensitivity. Accordingly, there is a need for increasingly compact and improved antenna arrays for locating systems that are both highly sensitive that may be manufactured at reduced cost, as well as to provide other advantages.

SUMMARY

The present disclosure relates generally to cost-efficient and compact locating system antenna arrays as well as methods of using such antenna array configurations in devices such as buried object locators.

For example, in one aspect, the disclosure relates to a buried object/utility locator. The locator may include, for example, a mast, a housing or case coupled to the mast, a processing element disposed in the housing or case, and a display element disposed on or within the housing or case. The locator may further include an antenna node. The antenna node may be mounted on or within or coupled to the mast. The antenna node may include an antenna array support structure, an interior omnidirectional antenna array disposed on the antenna array support structure, and a quad gradient antenna array disposed about the omnidirectional antenna array. A centerline of one or more pairs of antenna elements of the quad gradient antenna array, which may include coils with the centerline passing through a center of the coil, may substantially intersect a centerpoint of the omnidirectional antenna array. The omnidirectional array may include three orthogonal antenna coils in a substantially spheroid configuration.

In another aspect, the disclosure relates to an antenna assembly. The antenna assembly may include, for example, an antenna array support structure, an interior omnidirectional antenna array disposed on the antenna array support structure, and a gradient antenna array disposed about the omnidirectional antenna array.

In another aspect, the disclosure relates to an antenna assembly. The antenna assembly may include, for example, a central support assembly, seven antenna coils disposed about the central support assembly, wherein three of the seven coils are configured orthogonally in an omnidirectional ball assembly and four of the seven coils are positioned in diametrically opposed pairs around the omnidirectional ball assembly. Alternately, the antenna assembly may include three coils configured orthogonally in an omnidirectional ball assembly and two additional coils of four positions disposed around the enclosure. The two coils may be opposed pairs or may be orthogonal single antennas. In this configuration, the field strength in the direction of any of the four (or more) coils may be determined from the centrally determined magnetic field vector, and then gradients can be calculated from the center point of the array to any coil placed around the perimeter. This may be done to reduce the total number of processing channels (e.g., in common implementations where analog-to-digital converters are packaged in fours, a pair of four channel A/Ds (e.g., 8 channels) can be configured so that 3 channels are used for an upper orthogonal antenna array, three channels for a lower orthogonal antenna array, and two more channels may be used for gradient antenna coil processing (assuming that no switching is done)). Dummy coils may also be added to this configuration to balance mutual inductance In another aspect, the disclosure relates to an antenna node. The antenna node may include, for example, a node housing. The antenna node may further include an antenna assembly. The antenna assembly may include an antenna array support structure, an interior omnidirectional antenna array disposed on the antenna array support structure, and a gradient antenna array disposed about the omnidirectional antenna array.

In another aspect, the disclosure relates to an antenna node. The antenna node may include, for example, a node housing, and an antenna assembly. The antenna assembly may include a central support assembly and seven antenna coils disposed about the central support assembly. Three of the seven coils may be configured in an omnidirectional ball assembly and four of the seven coils may be positioned diametrically opposed around the omnidirectional ball assembly.

In another aspect, the disclosure relates to a buried object locator. The buried object locator may include, for example, a processing and display module, a locator mast, and an antenna node coupled to the locator mast. The antenna node may include a node housing and an antenna assembly. The antenna assembly may include an antenna array support structure, an interior omnidirectional antenna array disposed on the antenna array support structure, and a gradient antenna array disposed about the omnidirectional antenna array.

In another aspect, the disclosure relates to a buried object locator. The buried object locator may include, for example, a processing and display module, a locator mast, and an antenna node coupled to the locator mast. The antenna node may include a node housing and an antenna assembly. The antenna assembly may include a central support assembly and seven antenna coils disposed about the central support assembly. Three of the seven coils may be configured in an omnidirectional ball assembly and four of the seven coils may be positioned in diametrically opposed pairs around the omnidirectional ball assembly.

In another aspect, the disclosure relates to a module for use in a buried utility locator. The module may include, for example, a processing element. The module may further include a display element. The processing element may be configured to receive information from signals from a buried utility received at an omnidirectional antenna array and a gradient antenna array, and generate, based on both the signals received at the omnidirectional antenna array and the gradient antenna array, output information. The display module may be configured to render, as display information, the output information.

In another aspect, the disclosure relates to an antenna assembly for use in locator devices, including a central omnidirectional antenna ball, and a plurality of gradient coils positioned about the central omnidirectional antenna ball.

In another aspect, the disclosure relates to signal processing methods that may be performed in a processing element in a buried object locator in conjunction with the above-described elements.

In another aspect, the disclosure relates to a computer readable medium including instructions for causing a computer to perform signal processing methods in a processing element of a buried object locator.

In another aspect, the disclosure relates to means for implementing an antenna array for use in a buried object locator.

Various additional aspects, features, and functions are described below in conjunction with the appended Drawings.

BRIEF DESCRIPTION OF THE DRAWINGS

The present application may be more fully appreciated in connection with the following detailed description taken in conjunction with the accompanying drawings, wherein.

DETAILED DESCRIPTION

Figure 1:
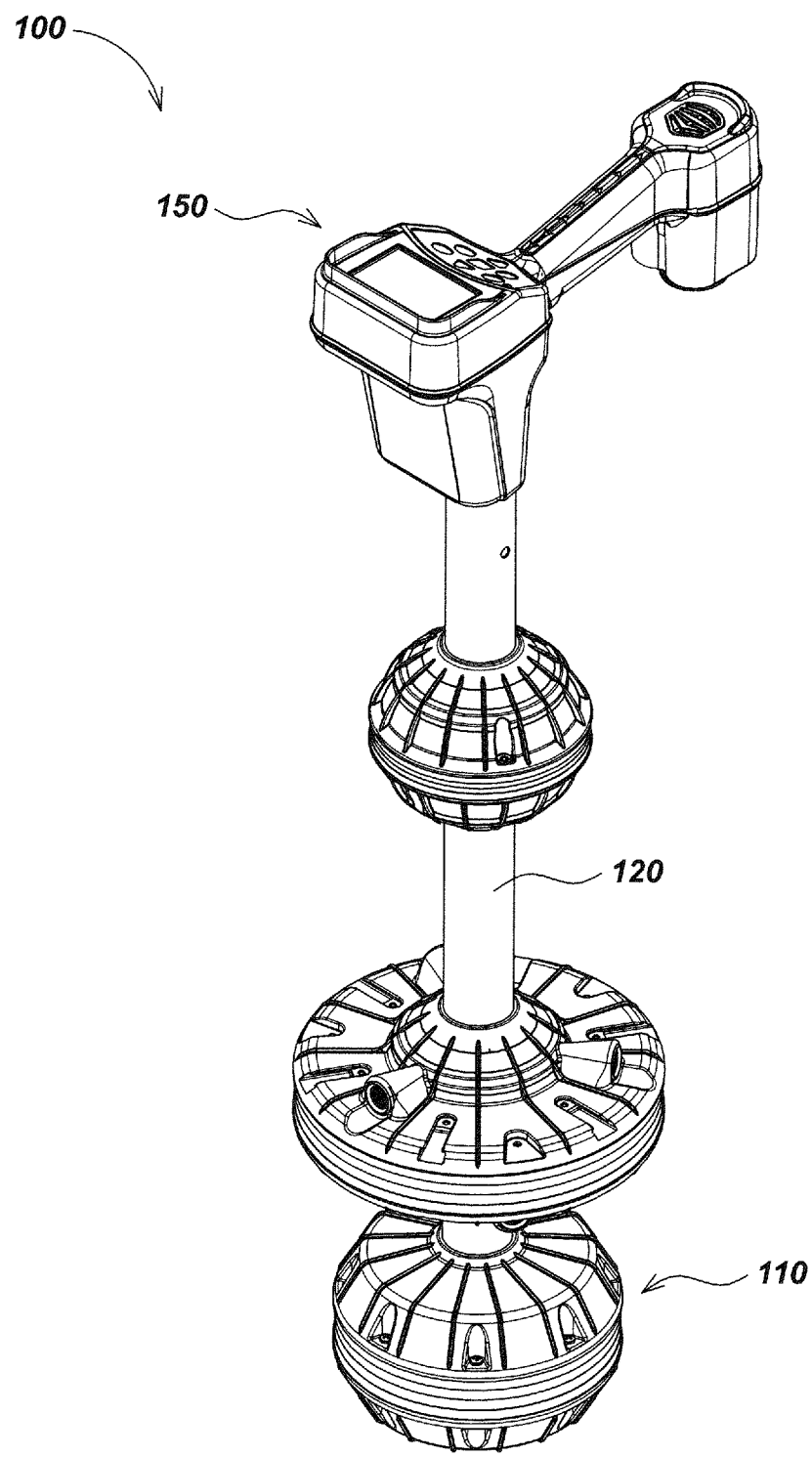
FIG. 1 is an illustration of an embodiment of a buried object locator with a quad-gradient coil antenna node.

This disclosure relates generally to locating systems used to detect buried or hidden objects, such as pipes, cables, conduits, or other objects that are buried or obscured or hidden from sight.

Various details of additional components, methods, and configurations that may be used in conjunction with the embodiments described subsequently herein are disclosed in co-assigned U.S. Pat. No. 7,009,399, entitled OMNIDIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Utility patent application Ser. No. 13/469,024, BURIED OBJECT LOCATOR APPARATUS & SYSTEMS, filed May 10, 2012, U.S. Utility patent application Ser. No. 13/570,084, HAPTIC DIRECTIONAL FEEDBACK HANDLES FOR LOCATION DEVICES, filed Aug. 8, 2012, U.S. Provisional Patent Application Ser. No. 61/619,327, entitled OPTICAL GROUND TRACKING APPARATUS, SYSTEMS, & METHODS, filed Apr. 2, 2012, and U.S. Provisional Patent Application Ser. No. 61/485,078, entitled LOCATOR ANTENNA CONFIGURATION, filed on May 11, 2011. The content of each of these patents and applications is hereby incorporated by reference herein in its entirety.

This application is also related to co-assigned U.S. Provisional Patent Application Ser. No. 61/559,696, filed Nov. 14, 2011, entitled QUAD-GRADIENT COILS FOR USE IN LOCATING SYSTEMS, to U.S. Provisional Patent Application Ser. No. 61/614,829, entitled QUAD-GRADIENT COILS FOR USE IN LOCATING SYSTEMS, filed Mar. 23, 2012, to U.S. Provisional Patent Application Ser. No. 61/561,809, filed Nov. 18, 2011, entitled MULTI-FREQUENCY LOCATING SYSTEMS & METHODS, and U.S. Utility patent application Ser. No. 13/677,223, entitled MULTI-FREQUENCY LOCATING SYSTEMS AND METHODS, filed Nov. 14, 2012. The content of each of these applications is hereby incorporated by reference herein in its entirety.

In one aspect, the disclosure relates to a buried object/utility locator. The locator may include, for example, a mast, a housing or case coupled to the mast, a processing element disposed in the housing or case, and a display element disposed on or within the housing or case. The locator may further include an antenna node. The antenna node may be mounted on or within or coupled to the mast. The antenna node may include an antenna array support structure, an interior omnidirectional antenna array disposed on the antenna array support structure, and a quad gradient antenna array disposed about the omnidirectional antenna array. A centerline of one or more pairs of antenna elements of the quad gradient antenna array, which may include coils with the centerline passing through a center of the coil, may substantially intersect a centerpoint of the omnidirectional antenna array. The omnidirectional array may include three orthogonal antenna coils in a substantially spheroid configuration.

The centerlines of two or more pairs of antenna elements of the quad gradient antenna array may, for example, substantially intersect a centerpoint of the omnidirectional antenna array. The omnidirectional antenna array and the quad gradient antenna array may be disposed or housed within a single antenna node housing. The antenna array support structure may include a central support assembly configured to position a plurality of coils of the interior omnidirectional antenna array in orthogonal directions. The antenna array support structure may be further configured to position a plurality of coils of the gradient antenna array circumferentially about the omnidirectional antenna array.

The interior omnidirectional antenna array may, for example, comprise three orthogonally oriented antenna coils. The orthogonally oriented antenna coils may be in a spheroid arrangement or other orthogonal antenna element arrangement. The gradient antenna array may include one or more diametrically opposed pairs of antenna coils. The gradient antenna array may include two or more gradient antenna coils and two or more dummy coils. The two gradient antenna coils may be orthogonally oriented. The two antenna coils may be co-axially oriented.

The locator may further include, for example, a switching circuit. The switching circuit may be configured to selectively switch two or more signals provided from antenna coils of the gradient antenna array. The selectively switched signals may be selectively provided to a common analog to digital (A/D) converter. The antenna coils of the gradient antenna array may be selectively coupled in an anti-series configuration to perform signal differencing of provided antenna signals.

The processing element may, for example, be configured to generate display information associated with a buried object or utility for rendering on the display element. The display information may be generated from magnetic field signals received at both the omnidirectional antenna array and the gradient antenna array. Output antenna signals from both the omnidirectional antenna array and the gradient antenna array may be provided to the processing element for generation of the display information. The display information may include a first set of display information generated from signals received at a distance from the buried utility based primarily on the gradient antenna array signals. A second set of display information may be generated from signals received in close proximity to the buried utility based primarily on the omnidirectional antenna array.

The display information may include, for example, a line representing the buried object or utility. The line may be generated based on magnetic field signals received at both the omnidirectional antenna array and the gradient antenna array. The display information may include information representing a position or location of the buried utility. The information representing a position or location of the buried utility may be generated based on magnetic field signals received at both the omnidirectional antenna array and the gradient antenna array. The position or location information may be further based on position or location information provided from a GPS, cellular, or other wireless location or positioning device. The display information may be based in part on a difference in position determined based on magnetic field signals received at both the omnidirectional antenna array and the gradient antenna array. The display information may be based in part on a distortion of a magnetic field signal received at the omnidirectional antenna array, the gradient antenna array, or both. The term "distortion" as used herein may generally refer to any measured field that may not fit a simple model of a single long linear buried utility. The representation of a position or location of the buried utility may include a blurred, distorted, or "fuzzed" object provided on the display element. The blurred, distorted, or "fuzzed" object may be a line or line segment. The representation of a position of the buried object may include a distinct color or shading of a line or other object. The distinct color or shading of the line or other object may be selected based on an amount of distortion of the received magnetic field signal or estimated error of the determined position or location. The representation of a position of the buried object may include an icon on the display element. The distortion of the received magnetic field signal or estimated error of the determined position or location may be represented by an icon on the display element.

The locator may further include, for example, an equatorial antenna coil. The equatorial antenna coil may be positioned about the omnidirectional antenna array and the gradient antenna array. The equatorial antenna coil may be positioned outside the omnidirectional antenna array but at least partially inside the gradient antenna array. The equatorial antenna coil, gradient antenna array, and omnidirectional antenna array may be enclosed within a single case or housing in the antenna node. The equatorial antenna coil may be an excitation coil, such as, but not limited to, an active radio frequency identification (RFID) coil.

The locator may be further configured to generate magnetic field signals from the omnidirectional antenna array, quad gradient antenna array, and/or equatorial antenna coil at a single or at multiple frequencies, such as described in, for example, co-assigned U.S. Provisional Patent Application Ser. No. 61/561,809, filed Nov. 18, 2011, entitled MULTI-FREQUENCY LOCATING SYSTEMS & METHODS, and commonly filed U.S. Utility patent application Ser. No. 13/677,223, entitled MULTI-FREQUENCY LOCATING SYSTEMS AND METHODS, filed Nov. 14, 2012, which are incorporated by reference herein. The processing element may be further configured to generate the display information further based on the multi-frequency signals provided from the antenna arrays. The displayed information associated with the buried object/utility may be based on magnetic signals provided and processed simultaneously at two or more frequencies from both the omnidirectional antenna array and the quad gradient antenna array.

In another aspect, the disclosure relates to an antenna assembly. The antenna assembly may include, for example, an antenna array support structure, an interior omnidirectional antenna array disposed on the antenna array support structure, and a gradient antenna array disposed about the omnidirectional antenna array.

The antenna array support structure may include, for example, a central support assembly. The support structure assembly may be configured to position a plurality of coils of the interior omnidirectional antenna array in orthogonal directions. The antenna array support structure may be further configured to position a plurality of coils of the gradient antenna array circumferentially about the omnidirectional antenna array.

The interior omnidirectional antenna array may include, for example, three orthogonally oriented antenna coils. The interior omnidirectional antenna array may include two orthogonally oriented antenna coils. The interior omnidirectional antenna array may include four or more antenna coils configured to sense magnetic signals in two or more orthogonal directions.

The gradient antenna array may include, for example, one or more gradient antenna coils. The one or more gradient antenna coils may be configured in diametrically opposed pairs. The one or more gradient antenna coils may include two diametrically opposed pairs of antenna coils. The gradient antenna coils may be positioned outside the interior omnidirectional antenna array. The gradient antenna coils may include one or more antenna coils. The gradient antenna coils may be coupled to a switching circuit configured to selectively switch ones or pairs of the gradient antenna coils. A switched output from the switching circuit may be provided to a processing element.

In another aspect, the disclosure relates to an antenna assembly. The antenna assembly may include, for example, a central support assembly, seven antenna coils disposed about the central support assembly, wherein three of the seven coils are configured orthogonally in an omnidirectional ball assembly and four of the seven coils are positioned in diametrically opposed pairs around the omnidirectional ball assembly. Alternately, the antenna assembly may include three coils configured orthogonally in an omnidirectional ball assembly and two additional coils of four positions disposed around the enclosure. The two coils may be opposed pairs or may be orthogonal single antennas. In this configuration, the field strength in the direction of any of the four (or more) coils may be determined from the centrally determined magnetic field vector, and then gradients can be calculated from the center point of the array to any coil placed around the perimeter. This may be done to reduce the total number of processing channels (e.g., in common implementations where analog-to-digital converters are packaged in fours, a pair of four channel A/Ds (e.g., 8 channels) can be configured so that 3 channels are used for an upper orthogonal antenna array, three channels for a lower orthogonal antenna array, and two more channels may be used for gradient antenna coil processing (assuming that no antenna coil switching is done)). Dummy coils may also be added to this configuration to balance mutual inductance. One or more additional coils may also be used.

In another aspect, the disclosure relates to an antenna node. The antenna node may include, for example, a node housing. The antenna node may further include an antenna assembly. The antenna assembly may include an antenna array support structure, an interior omnidirectional antenna array disposed on the antenna array support structure, and a gradient antenna array disposed about the omnidirectional antenna array.

The antenna array support structure may include, for example, a central support assembly configured to position a plurality of coils of the interior omnidirectional antenna array in orthogonal directions. The antenna array support structure may be further configured to position a plurality of coils of the gradient antenna array circumferentially about the omnidirectional antenna array. The interior omnidirectional antenna array may include three orthogonally oriented antenna coils. The gradient antenna array may include two diametrically opposed pairs of gradient antenna coils. The gradient antenna array may include three or more gradient antenna coils. The gradient antenna coils may be selectively switched.

The antenna node may further include a printed circuit board (PCB). The PCB may include a processing element configured to process signals generated from the omnidirectional antenna array and/or the gradient antenna array. The PCB may further include a switching circuit. The switching circuit may be configured to selectively switch pairs of signals provided from the gradient antenna array. The gradient antenna coils of the gradient antenna array may be coupled in an anti-series configuration to facilitate signal differencing. The gradient antenna coils may be selectively coupled in anti-series. Outputs from the gradient antenna coils may be time-division multiplexed.

In another aspect, the disclosure relates to an antenna node. The antenna node may include, for example, a node housing, and an antenna assembly. The antenna assembly may include a central support assembly and seven antenna coils disposed about the central support assembly. Three of the seven coils may be configured in an omnidirectional ball assembly and four of the seven coils may be positioned diametrically opposed around the omnidirectional ball assembly.

In another aspect, the disclosure relates to a buried object locator. The buried object locator may include, for example, a processing and display module, a locator mast, and an antenna node coupled to the locator mast. The antenna node may include a node housing and an antenna assembly. The antenna assembly may include an antenna array support structure, an interior omnidirectional antenna array disposed on the antenna array support structure, and a gradient antenna array disposed about the omnidirectional antenna array.

The processing and display module may be configured, for example, to generate a display associated with a buried utility. The display may be generated by using signals and information provided from both the omnidirectional antenna array and the gradient antenna array. The display may include information including a line representing the utility. The line may be generated based on signals received at both the omnidirectional antenna array and the gradient antenna array. The display may include information representing a position and/or orientation of the buried utility. The position and/or orientation of the buried utility may be based on signals received at both the omnidirectional antenna array and the gradient antenna array. The signals received at both the omnidirectional antenna array and the gradient antenna array may be combined to generate the position and/or orientation information. The display may be based in part on a difference in position determined based on signals received at the omnidirectional antenna array and the gradient antenna array. The display may be based in part on a distortion of a signal received at the omnidirectional antenna array, the gradient antenna array, or both.

In another aspect, the disclosure relates to a buried object locator. The buried object locator may include, for example, a processing and display module, a locator mast, and an antenna node coupled to the locator mast. The antenna node may include a node housing and an antenna assembly. The antenna assembly may include a central support assembly and seven antenna coils disposed about the central support assembly. Three of the seven coils may be configured in an omnidirectional ball assembly and four of the seven coils may be positioned diametrically opposed around the omnidirectional ball assembly.

The processing and display module may be configured, for example, to generate a display associated with a buried utility. The display may be generated by using signals and information provided from both the omnidirectional antenna array and the gradient antenna array. The display may include information including a line representing the utility. The line may be generated based on signals received at both the omnidirectional antenna array and the gradient antenna array. The display may include information representing a position and/or orientation of the buried utility. The position and/or orientation of the buried utility may be based on signals received at both the omnidirectional antenna array and the gradient antenna array. The signals received at both the omnidirectional antenna array and the gradient antenna array may be combined to generate the position and/or orientation information. The display may be based in part on a difference in position determined based on signals received at the omnidirectional antenna array and the gradient antenna array. The display may be based in part on a distortion of a signal received at the omnidirectional antenna array, the gradient antenna array, or both.

In another aspect, the disclosure relates to an antenna assembly for use in locator devices, including a central omnidirectional antenna ball, and a plurality of gradient coils positioned about the central omnidirectional antenna ball.

The diametric pairs of gradient antenna coils may be wired in anti-series to connect negative terminals of each diametric pair of gradient antenna coils together to perform a signal differencing process. The gradient coils may be arranged in diametrically opposed pairs. The antenna assembly may further include a switching circuit configured to selectively switch signals from the gradient antenna coil pairs. The signals may be switched based on a least common multiple of the periods of ones of a plurality of frequencies of received signals.

In another aspect, the disclosure relates to an antenna array for a locator apparatus. The locator apparatus may include a body, a quad-gradient antenna array or arrays, circuitry configured to receive and process signals, and a display circuit or display module configured to generate and/or control output information, which may include visual displays. The locator may further include an output module, which may be configured to provide audible and/or visual output information in conjunction with the display circuit and/or other circuits or modules. The quad-gradient antenna array may include a spherical omnidirectional antenna array and at least two pairs of gradient antenna coils. The spherical omnidirectional antenna array may further be composed of three antenna coils positioned orthogonally to one another. Each gradient antenna coil of the diametric gradient antenna coil pairs may be positioned closely around the central spherical antenna array such that they are diametrically located from its paired gradient antenna coil. In some instances, a different number of diametric pairs of gradient antenna coils may be used, for instance, three or four pairs. In some embodiments, odd numbers of gradient antenna coils may be used without a diametrically opposite antenna coil such as with the use of three or five gradient antenna coils.

The gradient antenna coils may, for example, be wired in anti-series such that a differencing or canceling of signals between diametrically positioned gradient antenna coil pairs may be communicated along one channel per diametric antenna coil pairing.

The gradient antenna coils may, for example, be wired whereby switching between each diametric pair of gradient antenna coils may occur. In these embodiments, differencing of signals may occur in hardware and/or in software.

The circuitry and output modules may be configured, for example, to generate a display associated with a buried utility. The display may be generated by using signals and information provided from both the omnidirectional antenna array and the gradient antenna array. The display may include information including a line representing the utility. The line may be generated based on signals received at both the omnidirectional antenna array and the gradient antenna array. The display may include information representing a position and/or orientation of the buried utility. The position and/or orientation of the buried utility may be based on signals received at both the omnidirectional antenna array and the gradient antenna array. The signals received at both the omnidirectional antenna array and the gradient antenna array may be combined to generate the position and/or orientation information. The display may be based in part on a difference in position determined based on signals received at the omnidirectional antenna array and the gradient antenna array. The display may be based in part on a distortion of a signal received at the omnidirectional antenna array, the gradient antenna array, or both.

In another aspect, the disclosure relates to a module for use in a buried utility locator. The module may include, for example, a processing element. The module may further include a display element. The processing element may be configured to receive information from signals from a buried utility received at an omnidirectional antenna array and a gradient antenna array, and generate, based on both the signals received at the omnidirectional antenna array and the gradient antenna array, output information. The display module may be configured to render, as display information, the output information.

The display information may include, for example, a line or other shape representing the position, location, and/or orientation of the buried utility. Alternately, or in addition, the display information may include a representation of a position of the buried utility, such as a text or graphical representation. The representation of a position of the buried utility may include a blurred, distorted, or "fuzzed" object. The blurred, distorted, or "fuzzed" object may be a line or line segment. Alternately, or in addition, the representation of a position of the buried object may include a distinct color or shading of a line or other object. The representation of a position of the buried object may include one or more icons.

The display information may be based, for example, on a difference in position determined based on signals received at the omnidirectional antenna array and the gradient antenna array. Alternately, or in addition, the display information may be based on a distortion of a signal received at the omnidirectional antenna array, the gradient antenna array, or both.

In another aspect, a time multiplexing method may, for example, be used to interpret signals from a quad-gradient antenna array when the gradient antenna coils may be wired allowing switching between each diametric pair of gradient antenna coils.

In another aspect, a least common multiple method may, for example, be used to determine the period at which the switching between gradient antenna coils occurs. In some embodiments, the locating device may be enabled to sense the frequency of the signal, for instance, 50 Hz or 60 Hz. Such embodiments may be further enabled to sync the switching of the gradient antenna coils at the zero crossing of one of the phases of the sensed 50/60 Hz grid.

The following exemplary embodiments are provided for the purpose of illustrating examples of various aspects, details, and functions of the present invention; however, the described embodiments are not intended to be in any way limiting. It will be apparent to one of ordinary skill in the art that various aspects may be implemented in other embodiments within the spirit and scope of the present invention.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Various additional aspects, features, and functions are described below in conjunction with FIGS. 1 through 27B of the appended Drawings.

Example Embodiments

FIG. 1 illustrates details of an embodiment 100 of a locating device (also denoted herein as a "buried object locator" or "locator" for brevity) that may include a quad-gradient antenna node 110 in accordance with certain aspects. The antenna node 110 may include multiple antenna components including a housing and a plurality of antennas within the housing comprising an antenna assembly, which may comprise multiple antenna arrays including an omnidirectional antenna array and a gradient antenna array. Antenna node 110 may be mounted or coupled at or near a distal end of a locator mast 120 as shown, or, in some embodiments, may be positioned elsewhere on a locator or similar system. In an exemplary embodiment, the gradient antenna array includes four antenna coils, and the omnidirectional antenna array may include a plurality of antenna coils, which may be nested in a spheroid shape. The axes of the gradient coils may be positioned substantially in a plane that intersects the center of the omnidirectional antenna array. In an exemplary embodiment, the gradient coils may be positioned within approximately one half antenna diameter or ferrite core length of the center of the orthogonal antenna coil array center.

A proximal end of the antenna mast may be coupled to a locator processing and display module 150 which may include a case or housing and one or more elements configured to receive and process signals from the antenna node 110 and/or other inputs, such as sensor elements such as position sensors (e.g., GPS, ground tracking optical or acoustic sensors, cellular or other terrestrial wireless positioning elements, and the like), inertial sensors (e.g., accelerometers, gyroscopic sensors, compass sensors, etc.) as well as other sensors or related devices.

Module 150 may further include user interface elements such as switches, pushbuttons, touch display panels, mice or trackball devices, or other input elements, as well as output elements such as one or more visual display elements such as one or more LCD panels, lights or other visual outputs, as well as audio output elements such as audio speakers, buzzers, haptic feedback elements, and the like. Module 150 may further include one or more processing elements for receiving and processing antenna signals, sensor signals, user inputs, and/or other input signals and generating outputs to be provided on the display elements and/or for storage in memory or on storage devices such as USB flash devices, disks, or other computer storage devices or systems. Processing of signals from the antenna node 110 may be performed by one or more processing elements in the node and/or by processing elements in the processor and display module 150 or in other modules (not shown) located elsewhere in the locator 100.

Figure 2:
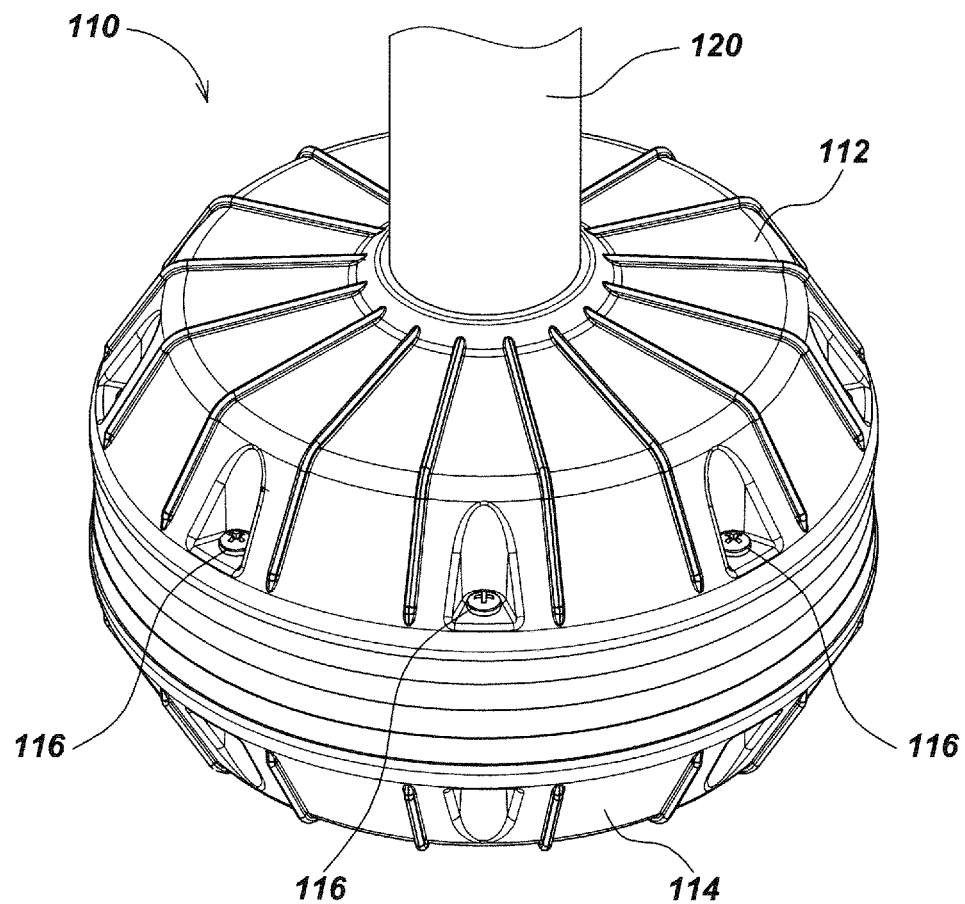
FIG. 2 is an isometric view of an embodiment of a quad-gradient coil antenna node and a section of a locator mast.

FIG. 2 illustrates additional details of a housing and an external surface of the housing of quad-gradient antenna node embodiment 110 coupled at or near a distal end of locator mast 120. External components of the quad-gradient antenna node 110 may include a housing, which may include components such as top shell half 112 that may be coupled to a bottom shell half 114 by, for example, a series of screws 116 or other attachment mechanisms. In some embodiments, the housing may be made from other shell components and configurations, such as additional shell components beyond the top and bottom shell halves shown in FIG. 2. In addition, in some embodiments, other external components such as sensors, accessories, or other components (not shown) may also be located on or in proximity to antenna node 110.

Figure 3:
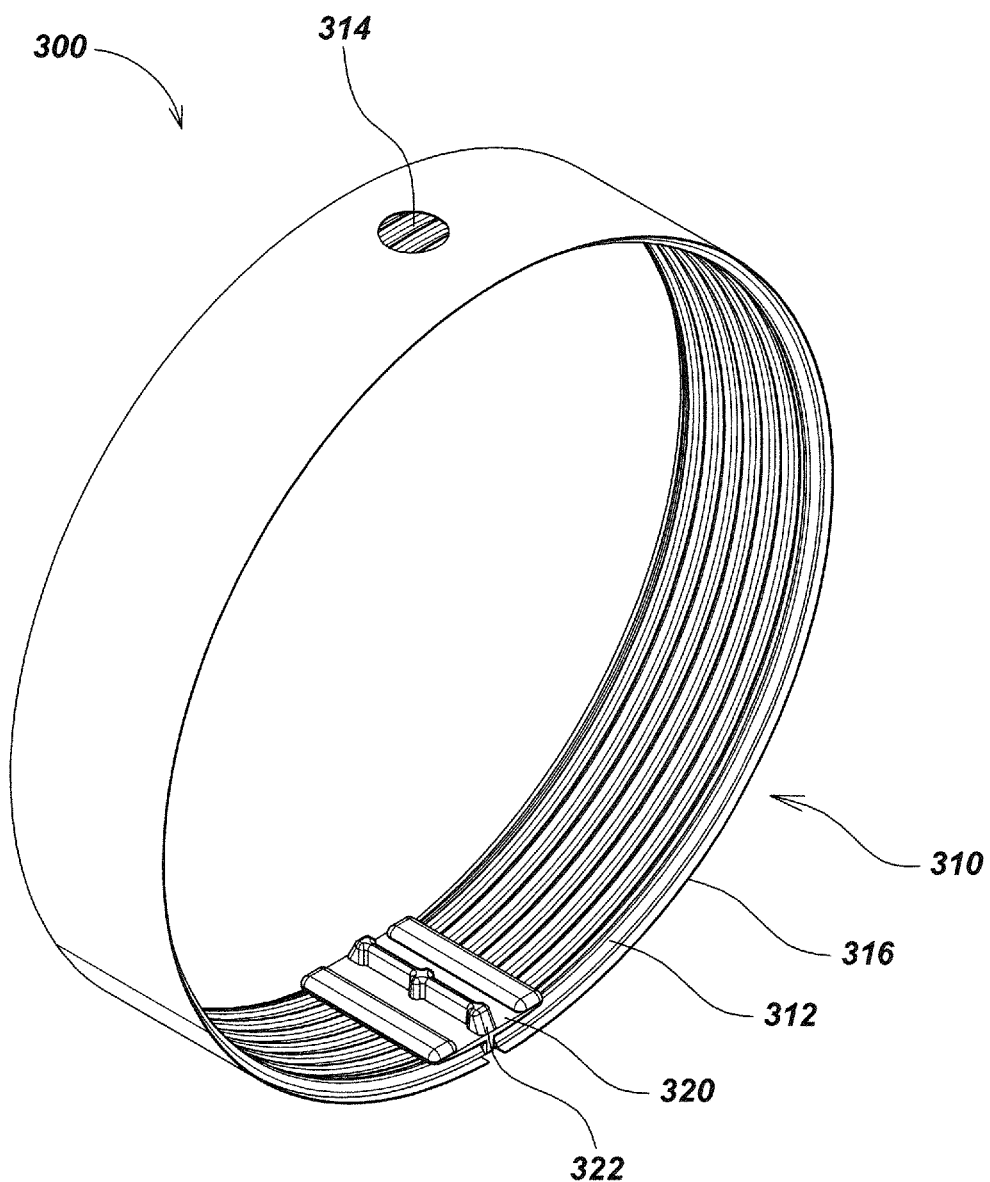
FIG. 3 is an exploded isometric view of an antenna coil from the quad-gradient coil antenna node embodiment of FIG. 2.

Internally, quad-gradient antenna node 110 may include one or more individual antenna elements or coils, such as the antenna coil 300 as illustrated in FIG. 3. The antenna elements may be mounted on or coupled to or disposed in an antenna array support structure configured to house the antenna coils and other components.

In some embodiments, additional coils (not shown), denoted as "dummy coils" may be used, such as in a front-to-back configuration, to balance the mutual inductance on the central omnidirectional antenna array coils ("triad"). This may be configured to provide better rotational accuracy and symmetry.

FIG. 3 illustrates details of one embodiment of a coil that may be used in antenna nodes such as node 110. As shown in FIG. 3, a thin metal core 310 may be formed with a plurality of ridges 312 defining a series of U-shaped grooves which are substantially equally spaced apart axially. The grooves on the outer surface of the metal core 310 may be wound with multiple strands of an insulated wire 314 resting on an insulating layer 316 that may comprise a low dielectric material such as Teflon® tape or other dielectric materials. In some embodiments, the two ends of the core may be spaced a short distance from each other and secured by a plastic connector 320 that may be formed with a central riser 322. Details of example embodiments of individual antenna coil elements as may be used in embodiments of the present invention are described in, for example, U.S. patent application Ser. No. 12/367,254, filed Feb. 6, 2009, entitled LOCATOR ANTENNA WITH CONDUCTIVE BOBBIN, the content of which is incorporated by reference herein in its entirety.

Figure 4:
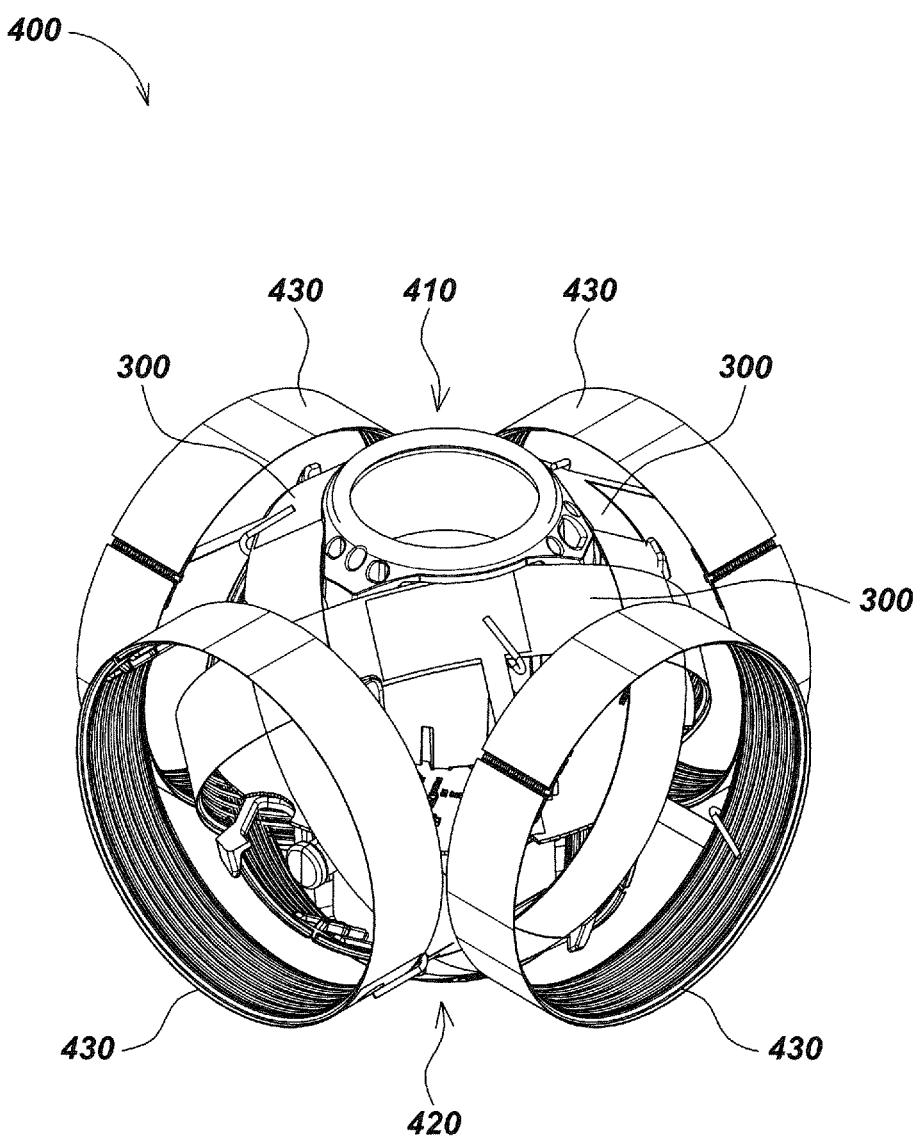
FIG. 4 is an isometric view of a quad-gradient antenna array embodiment.

Turning to FIG. 4, in an exemplary embodiment, a quad-gradient antenna array, such as the quad-gradient antenna array 400 within quad-gradient antenna node 110, may include seven antenna coils, which may be coils 300 and coils 430 or other antenna elements of different sizes, shapes, and/or configurations. In this example embodiment, a first subset of the coils may be orthogonally oriented antenna coils in an omnidirectional antenna array and a second subset of the coils may be diametrically opposed antenna coils in a gradient antenna array. Other configurations and/or numbers of antenna elements may be configured in different array arrangements that include omnidirectional elements and gradient elements in alternate embodiments.

For example, the antenna coils 300 may be secured on or within an antenna array support structure, such as central support assembly 410, such that the three antenna coils 300 are orthogonal to one another to form an omnidirectional antenna array, such as the omnidirectional antenna ball assembly 420. Further details of embodiments of omnidirectional antennas and related support structures as may be used in various embodiments are described in, for example, co-assigned U.S. Pat. No. 7,009,399, entitled OMNIDIRECTIONAL SONDE AND LINE LOCATOR, issued Mar. 7, 2006, the content of which is incorporated herein in its entirety.

The antenna coils 430 may be positioned circumferentially about the omnidirectional antenna ball assembly 420 such that each antenna coil 430 may be diametrically located from a paired antenna coil 430 to form a gradient coil antenna array assembly. In some embodiments, fewer than or more than four antenna coils may alternately be used in the gradient coil antenna array. Additional coils (not shown) may also be attached to the bottom and top of the omnidirectional antenna ball assembly to form a third, vertical gradient coil pair. Similarly, in some embodiments, fewer than or more than three antenna coils may be used in the omnidirectional antenna array. In some embodiments, different coil types, shapes, sizes, or configurations may be used for the omnidirectional and/or gradient antenna arrays.

In an exemplary embodiment, such as shown in FIG. 4, a center of the gradient coil arrays may be substantially co-planar with the centers of the omnidirectional antenna array elements. In this configuration, axes through the centerlines of the two pairs of gradient coils 430 (e.g, if the two coils were wheels the centerlines would correspond to an axle through their centers) intersect at a common point, which also intersects the centerpoint of the omnidirectional array coils 300. The combination of omnidirectional antenna array coils and gradient array coils may be housed in a single enclosure to form an integral combination omnidirectional and gradient antenna node.

Figure 9:
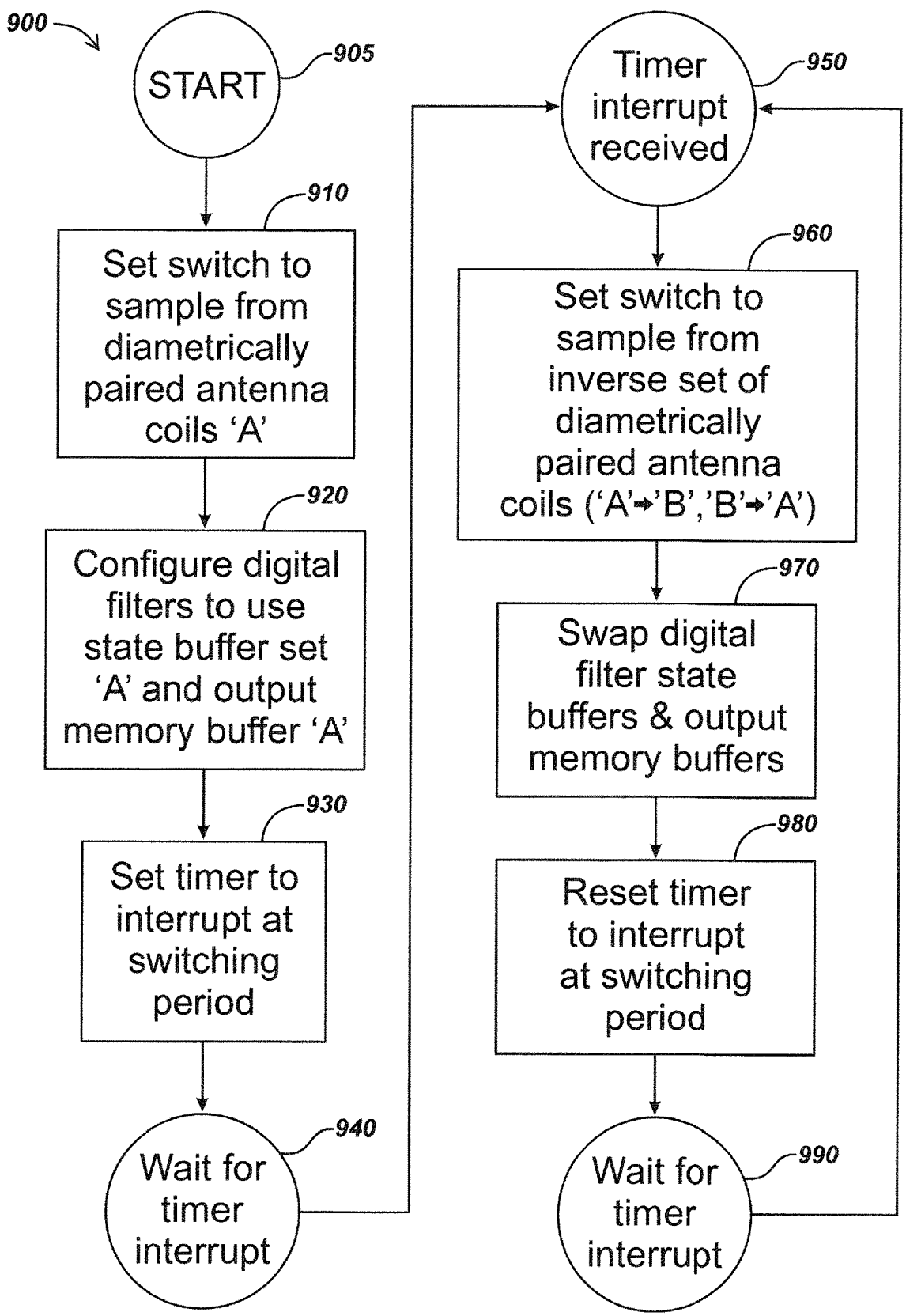
FIG. 9 is an embodiment of a process illustrating a time multiplexing method for interpreting signals between switching diametric pairs of gradient antenna coils.

In some embodiments, an antenna array may be implemented similar to array 400 of FIG. 4, but include an eighth, larger diameter equatorial coil (as illustrated in FIGS. 21-25) which may be configured similarly to antenna coil 300, surrounding the four coils 430 and having a vertical central axis aligned with antenna support 120. The centerline plane of symmetry of this additional coil may be positioned to approximately intersect the center of the central omnidirectional array 410. This additional coil may be used to sense vertical fields and/or may be configured as an active coil to energize and excite radio frequency identification device (RFID) markers or other devices. This additional coil may be entirely enclosed inside the quad gradient antenna node enclosure 410 or, in some embodiments, may be positioned external to the enclosure. An example of a similar configuration is illustrated in FIG. 9 of co-assigned U.S. patent application Ser. No. 13/469,024, entitled BURIED OBJECT LOCATOR APPARATUS AND SYSTEMS, filed May 10, 2012, the content of which is incorporated by reference herein. In some embodiments, the equatorial coil may be positioned inside the gradient coils (e.g., as shown in FIG. 9 of the '024 application), however, in other embodiments it may be positioned outside to sense vertical fields and/or excite RFID devices or other electromagnetic devices.

Figure 5:
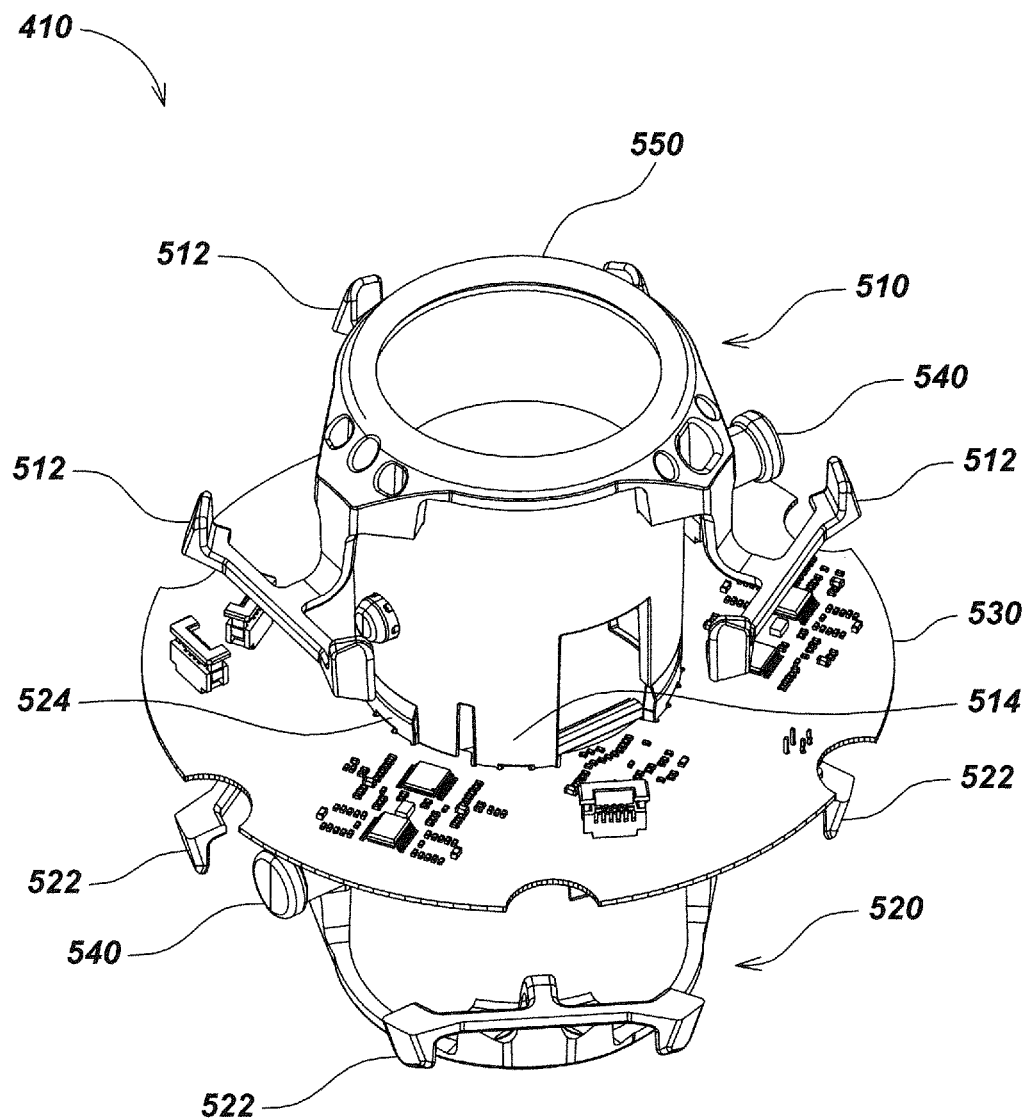
FIG. 5 is an isometric view of a central support structure embodiment from a quad-gradient antenna array.
Figure 6:
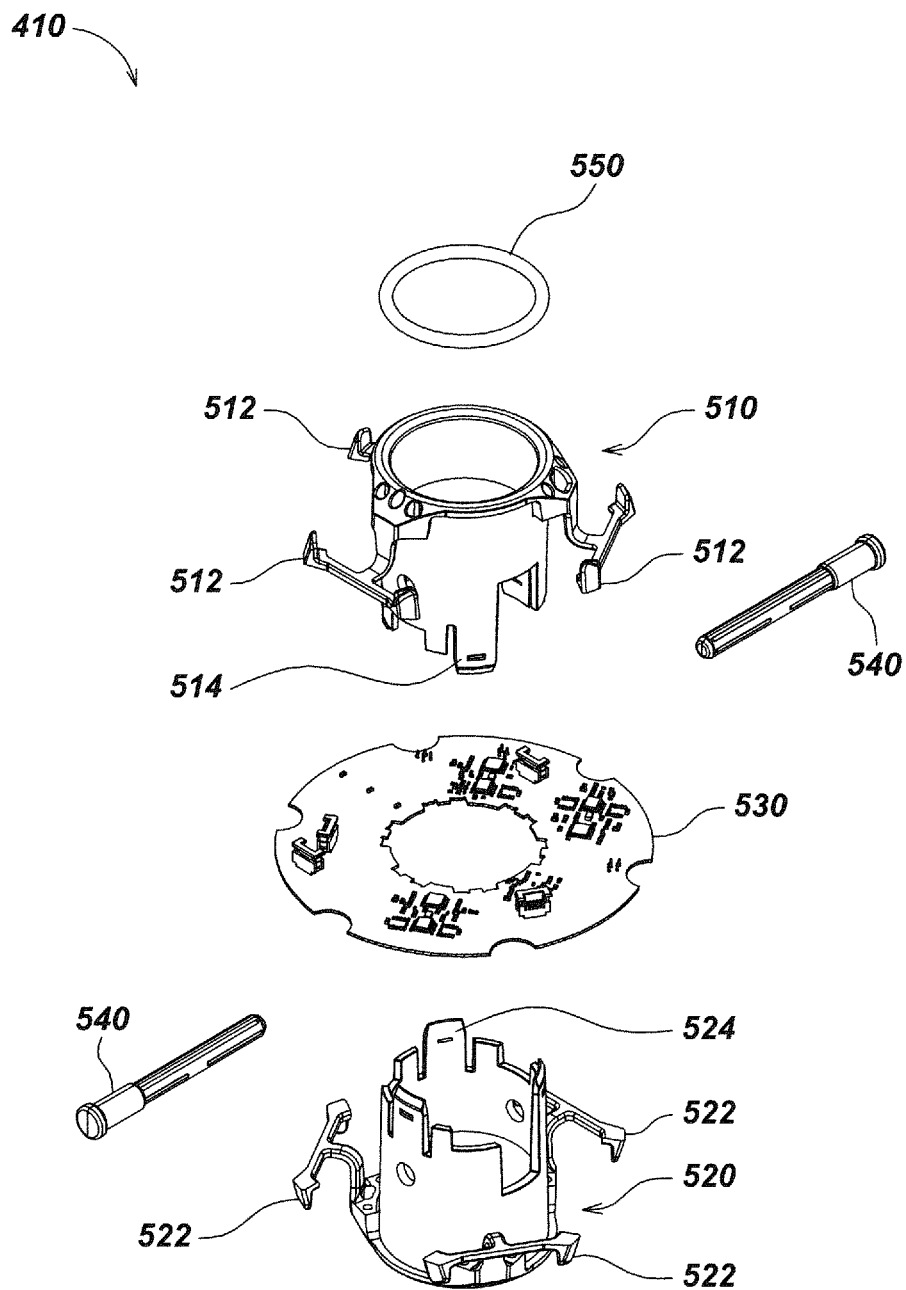
FIG. 6 is an exploded isometric view of a central support structure embodiment from a quad-gradient antenna array.

Turning to FIGS. 5 and 6, details of an embodiment of a central support assembly 410 are illustrated. As shown, the assembly 410 may include a central support top half 510 with top coil support arms 512, a central support bottom half 520 with bottom coil support arms 522, a printed circuit board (PCB) 530, which may be disk-shaped, and/or a series of pins 540.

In an exemplary embodiment, the central support top half 510 and the central support bottom half 520 may be configured to be substantially cylindrical in shape as shown so that the locator mast 120 may be allowed to pass through the center of both when assembled. In other embodiments, different shapes and/or orientations may be used depending on the node or mast configuration and/or on other locator system requirements or constraints. Similarly, PCB 530 may be formed in a disk shape as shown to mount within a spherical or rounded housing of the antenna node 110.

The top coil support arms 512 and the bottom coil support arms 522 may be designed to hold the three antenna coils 300 in place to form the omnidirectional ball assembly 420. PCB 530 may be configured to receive and process sensor signals from the antenna coils 300, antenna coils 430, and/or from other inputs such as additional sensors such as inertial and magnetic sensors. The signals may be processed in a processing element or elements disposed on PCB 530 and/or elsewhere in the locator or other device.

PCB 530 may be configured such that it sits centrally within the omnidirectional ball assembly 420, thereby allowing the assembled central support top half 510 and the central support bottom half 520 to fit through the center of the disk-shaped PCB 530.

The central support top half 510 may be formed with a top fastener formation 514 and the central support bottom half 520 with a bottom fastener formation 524 that may allow the central support top half 510 and the central support bottom half 520 to each independently be secured to the PCB 530. In assembly, two of the pins 540 may pass through holes formed on the central support top half 510, the central support bottom half 520, and the locator mast 120, thereby securing the quad-gradient antenna node 110 to the locator mast 120. An O-ring 550 located at the top of the central support top half 510 may be used to provide a protective seal to the quad-gradient antenna node 110.

Figure 7:
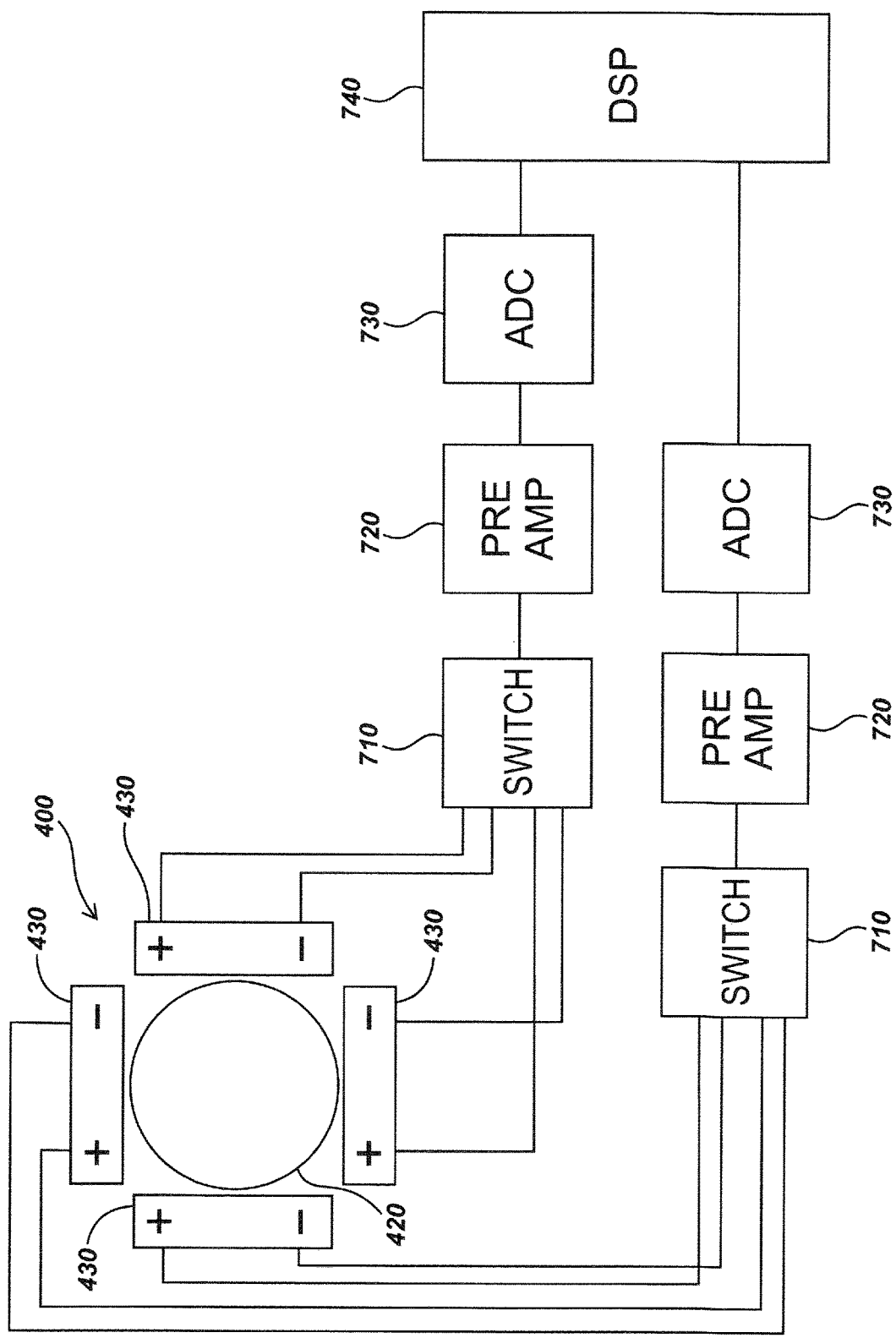
FIG. 7 is a diagram illustrating using a switch embodiment for switching between diametric pairs of gradient antenna coils.

FIG. 7 illustrates details of an embodiment of an antenna array switching module which may be implemented using antenna coils as described previously herein, in conjunction with a processing element and related components, such as pre-amp 720, switches 710, and analog-to-digital converters 730. The processing element may include a digital signal processing device or DSP 740 and/or may be implemented on other processing elements, such as general or special purpose microprocessors or microcontrollers, ASICs, FPGAs, or other programmable devices, as well as other devices such as memories, I/O devices, A/D converters, or other electronic components. The switching between paired gradient antenna coils may be controlled by DSP 740 or some other system control element, such as switching circuit, processor with associated firmware or software, or other devices. In operation, various antenna elements may be switched in or out of the circuit to facilitate signal processing and output functions such as are described subsequently herein.

For example, in the switching module configuration of FIG. 7, one antenna coil 430 from each diametric pair of antenna coils 430 positioned circumferentially about the omnidirectional antenna ball assembly 420 in the gradient array may be wired to the same switch 710 such that a gradient signal may be generated from one of the two diametric pairs of antenna coils 430 at a particular point or period in time. This configuration allows for time-division multiplexing of gradient signals, which may be done in multiple orthogonal directions. From the switch 710, a switched output signal may be sent to a preamp 720 for amplification before being sent as an input signal to an analog-to-digital (ADC) converter 730. From the ADC 730, a digital output signal may then be communicated to a digital signal processor (DSP) 740 or other processing component. In embodiments with greater than four antenna coils 430 positioned about antenna ball assembly 420, more than two channels may be used. In such embodiments, differencing of the signals may be done in software or hardware.

Figure 8:
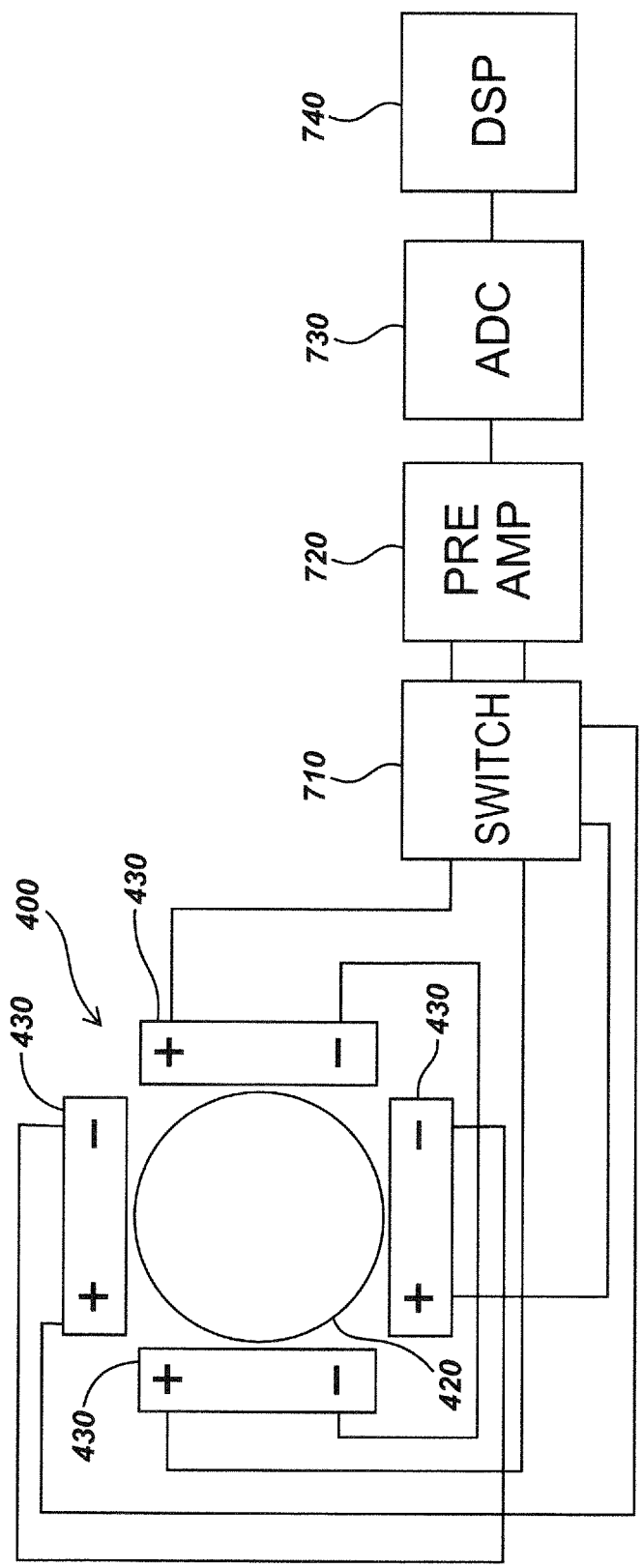
FIG. 8 is a diagram illustrating an embodiment of gradient antenna coils wired in an anti-series configuration.

In the switching module configuration of FIG. 8, the four antenna coils 430 positioned circumferentially about the omnidirectional antenna ball assembly 420 may be wired in anti-series such that the negative terminals on the diametric pairs of antenna coils 430 are connected together, while their positive terminals are connected to the same preamp 720. Similar to the configuration shown in FIG. 7, switched signals may then be communicated to an ADC 730 and then a DSP 740.

In such embodiments, wiring negative to negative on diametric pairs of antenna coils 300 may allow for a canceling or differencing of signals in the gradient array. Additional details of differencing signal processing devices and methods are described in, for example, U.S. Provisional Patent application Ser. No. 61/485,078, filed May 11, 2011, entitled LOCATOR ANTENNA CONFIGURATION, the content of which is incorporated by reference herein.

In some embodiments, the four antenna coils 430 positioned circumferentially about the omnidirectional antenna ball assembly 420 may also be wired in anti-series with opposite polarities such that the positive terminals on the diametric pairs of antenna coils 430 are connected together, while their negative terminals are connected to the same preamp 720. Other configurations of switchable interconnections between antenna elements, such as when more or fewer antenna elements are used, may also be implemented in various embodiments.

Turning to FIG. 9, details of an embodiment 900 of time multiplexing signal processing are illustrated. This method may be used with the signals generated from diametrically paired ones of the four antenna coils 430 as described with FIG. 7.

At stage 905, switch 710 may be set to sample from one diametric pair of antenna coils 430 in block 910. At stage 920, digital filters may be configured to use state buffers and/or output memory buffers corresponding to the chosen diametric pair of antenna coils 430. At stage 930, a timer may be set to generate an interrupt at the given switching period. At stage 940, a wait period for the timer interrupt may be performed. Once the timer interrupt is received at stage 950, switch 710 made be set to sample from the inverse diametric pair of antenna coils 430 at stage 960. At stage 970, the digital filter state buffers and output memory buffers may be switched to coincide with that of the selected diametric pair of antenna coils 430 from stage 960. The timer may then be reset to interrupt at the switching period at stage 980. At stage 990, an action to wait for the timer interrupt may be performed. Processing may then return to stage 950 once the timer interrupt is received. In some embodiments, such as the embodiment 900, the start/stopping of the filtering process may coincide with the same phase point with the high energy, for instance 50 or 60 Hz, background signals to minimize ringing in the digital filters due to switching transients.

Figure 10:
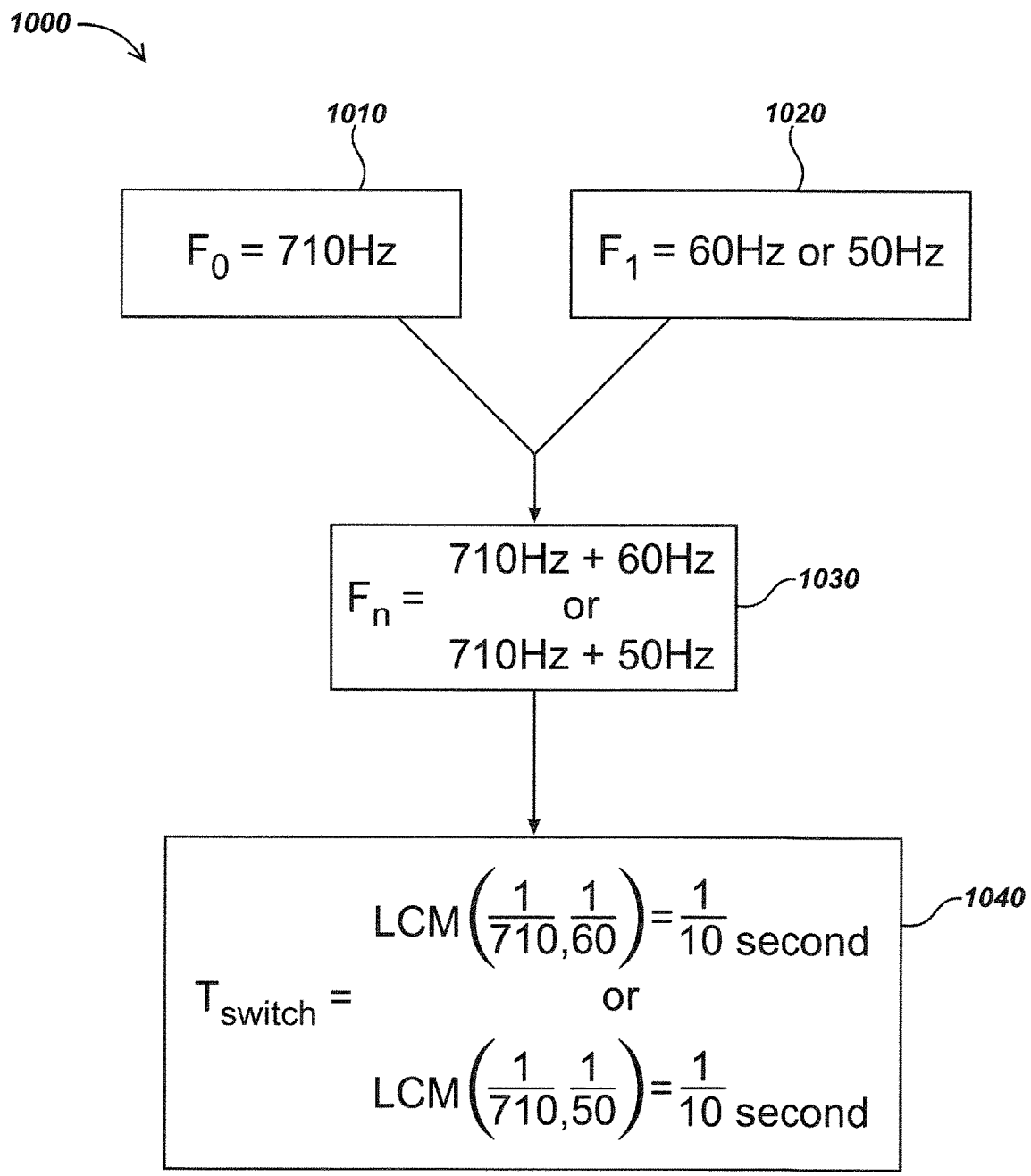
FIG. 10 illustrates an embodiment of a least common multiple method for determining the length of time by which switching occurs between diametric pairs of gradient antenna coils.

Turning to FIG. 10, details of an embodiment 1000 of a least common multiple method for signal processing are illustrated. This method may be used to determine timing of switching of the antenna coils 430 when using the time multiplexing method of FIG. 9 to determine a least common multiple of the periods of the sensed signals. To avoid introducing transients into a digital filter, an integer number representing the least common multiple of periods of all sensed signals may be used to determine the frequency at which the antenna coils 430 should be switched. For example, a 710 Hz signal in block 1010 and a 50 or 60 Hz signal in block 1020 may both be sensed as shown in block 1030. At stage 1040, a calculation may be made whereby the least common multiple results in the appropriate run length of the digital filter, for the example frequencies shown, is 1/10 of a second. In such embodiments, Fourier analysis of the continually sensed antenna coils 300 in the omnidirectional antenna ball assembly 420 may be used to determine the frequencies of the sensed signals.

Figure 11:
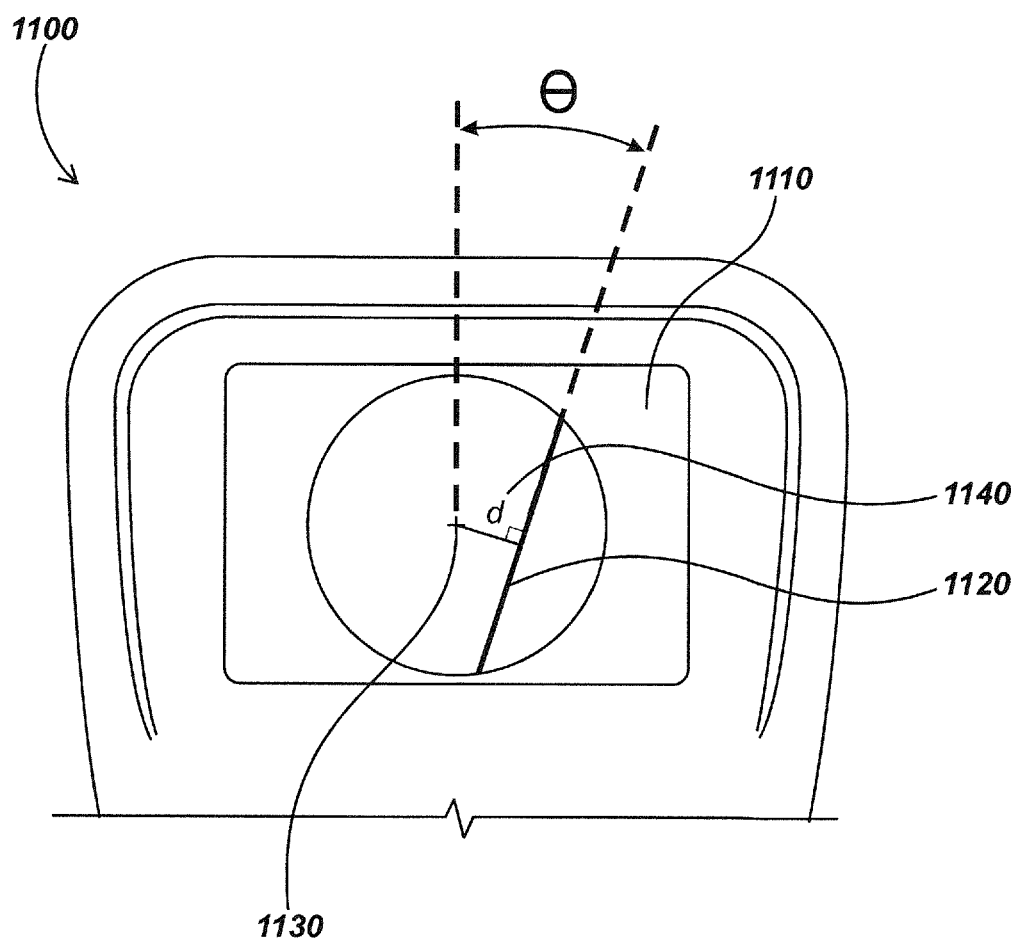
FIG. 11 is a top view of an embodiment of a graphical user interface that may be used in a locator or other device.
Figure 12:
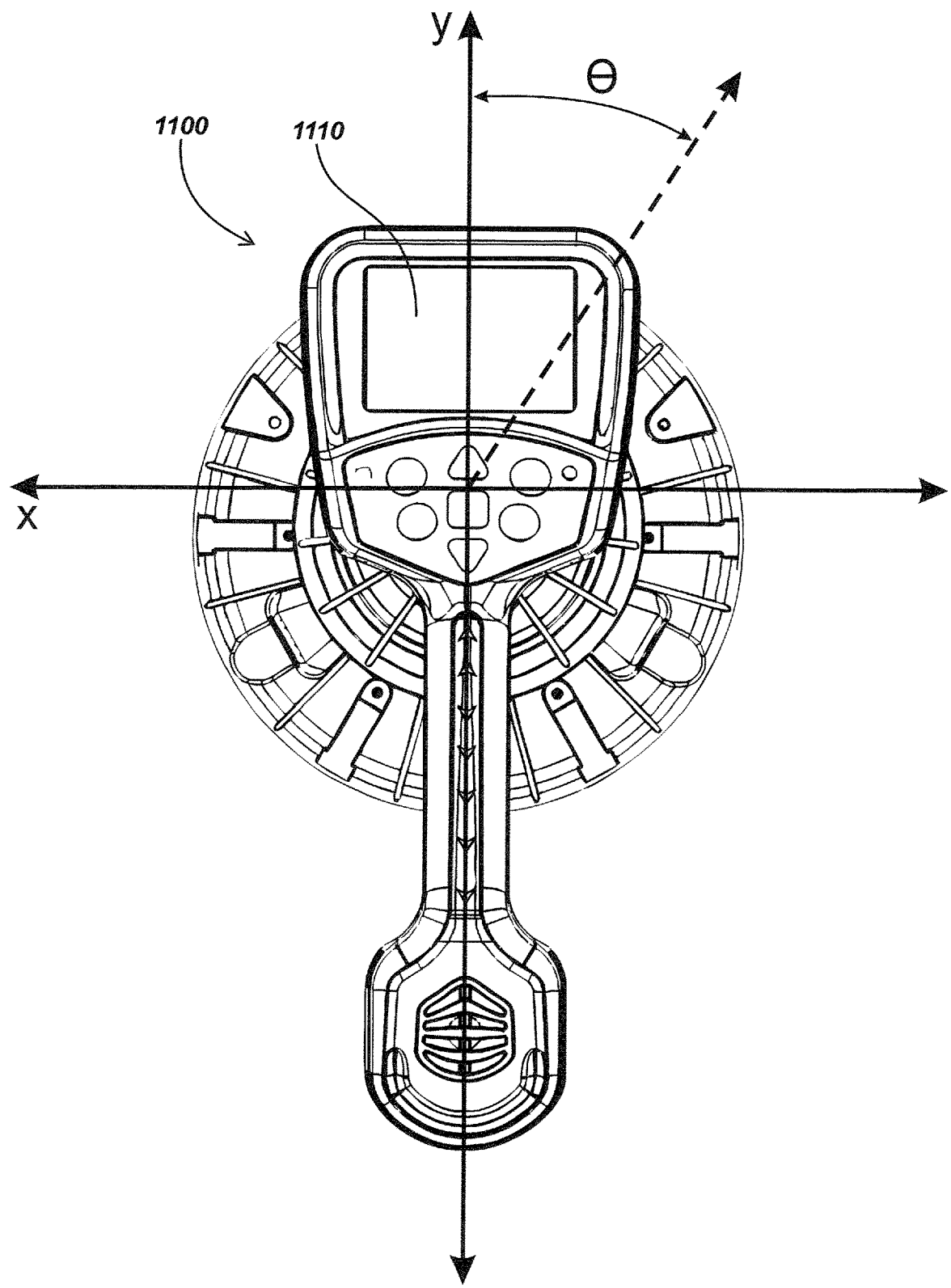
FIG. 12 is top view of a locator device embodiment illustrating an xy plane and azimuthal angle.
Figure 13:
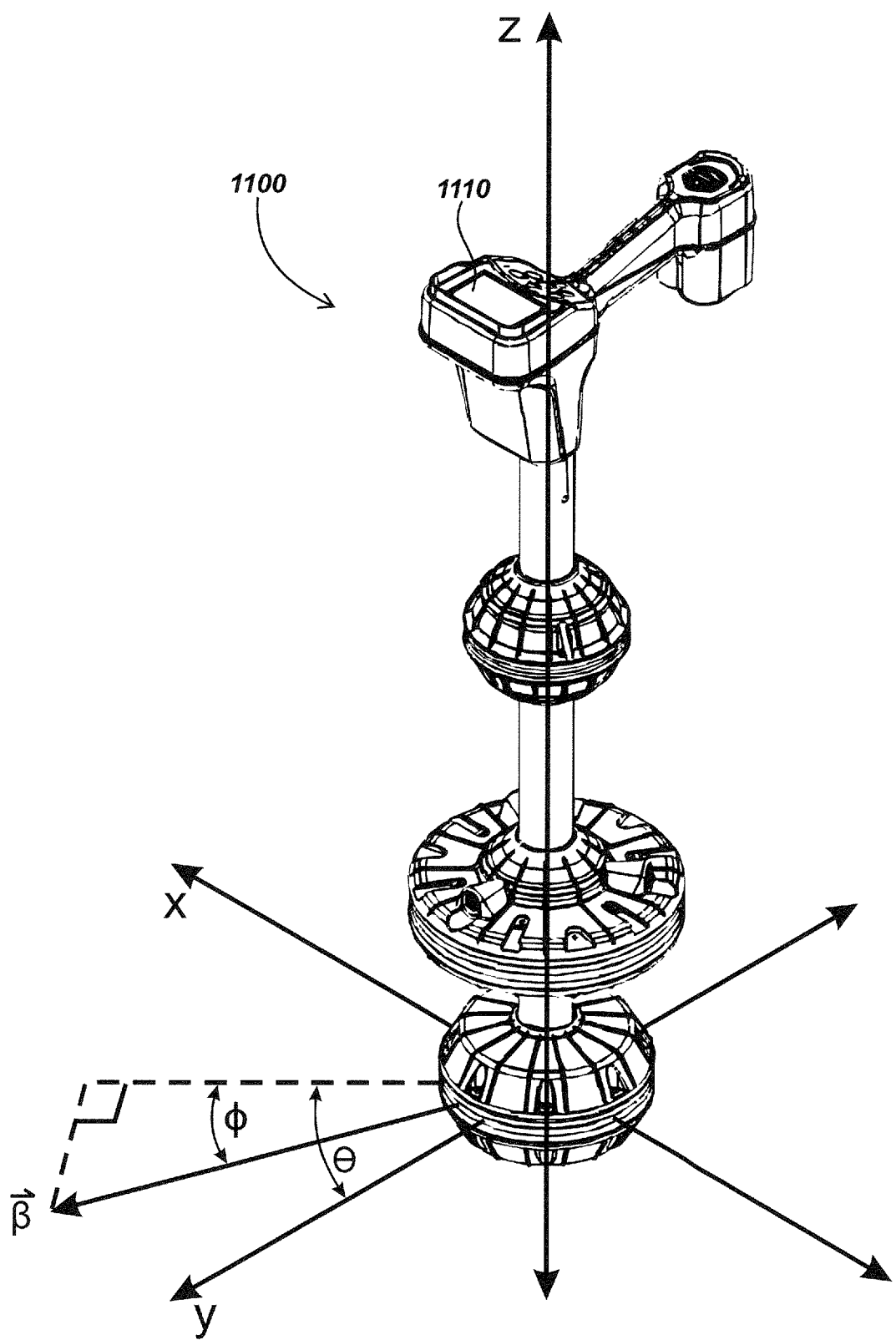
FIG. 13 is an isometric view of a locator device embodiment illustrating an angle of altitude.

Turning to FIGS. 11-13, a locating device 1100 in accordance with aspects shown in part in FIG. 11 may include a graphical user interface (GUI) 1110 for visually presenting information to a user on a display, such as an LCD panel or other display device. The locating device 1100 may correspond with the locator of FIG. 1 and may be part of display module embodiment 150 in some embodiments. In the GUI display, a line associated with a buried utility or other target, such as a guidance line 1120, may be rendered on the screen to indicate the orientation and/or location and/or position of and to guide a user to the utility and to determine the relative position of the buried utility with respect to the locator for mapping purposes. The line may be provided in a common display color (e.g., a solid black line on a black and white display) and/or may be displayed using a distinct color, shading, highlighting, dashing, fuzziness or distortion, dashing, etc. in various embodiments. In calculating the placement and orientation of the guidance line 1120, a distance 'd', 1140, may be determined from the screen centerpoint 1130 to the guidance line 1120. The distance d may be determined orthogonally to the guidance line 1120, and a scaled representation of the physical distance between the location of the locating device 1100 to the sensed utility may be determined and presented to a user. The distance d may be presented textually (e.g, X meters or feet) and/or graphically (e.g., on the display device as a symbol, color or shading, etc.), and/or may be presented audibly, such as on speakers or a headphone (not shown) coupled to the locator. The distance value of d may also be stored, such as in a memory or other data storage device of the locator, and may be transmitted to other devices or systems, such as by using a wired or wireless communications link, for further display, storage, processing, mapping, etc.

To calculate d, the locating device may use the equation:

$$d = \{(\cos\phi)^2 \times [(\sin\Theta)^2 \times C_1 \times G_h^2 + (\cos\Theta)^2 \times C_2 \times G_v^2] + (\sin\phi)^2 \times C_3\}^{1/2}$$

In the aforementioned equation, the angle θ, as best illustrated in FIGS. 12 and 13, may be defined as the azimuthal angle of the sensed utility line in the xy plane. The angle ϕ, as illustrated in FIG. 13, may be the altitudinal angle of the vector β from the xy plane. The variable $G_h$ may be calculated as being equal to the measurements of the right side gradient coil minus the measurement of the left side gradient coil, and the variable $G_v$ may be calculated as being equal to the measurements of the front gradient coil minus the measurement of the rear gradient coil. The constants $C_1$, $C_2$, and $C_3$ may be predetermined, such as by a device programmer during a calibration or testing procedure, and then stored in a memory of the locator for use in scaling the distance d to the graphical user interface 1110. In some embodiments, the constants may be dynamically determined by the device, such as during a calibration or operational process, and/or may be entered by a user.

In some embodiments, such as a locating device in which the graphical user interface screen is square in shape, the scaling constants of $C_1$ and $C_2$ may be equal. The equation for calculating the distance d also has the effect that when the locator device 1100 is close to the sensed utility, data gathered from the antenna coils of the gradient antenna array may be given greater weight than data gathered by the omnidirectional antenna array. When the locator device 1100 is further from the sensed utility, data gathered from the omnidirectional antenna array may be given greater weight within the aforementioned equation to find d and less weight may be given to data gathered by the antenna coils of the gradient antenna array. In doing so, the locating device 1100 may take advantage of greater accuracy of the gradient antenna array when close to the sensed utility and greater accuracy of the omnidirectional antenna array when further from the sensed utility. In the graphical user interface 1110, the orientation of the guidance line 1120 may also be determined by θ.

In the preceding paragraphs associated with FIGS. 11-13, one particular method of combining information from the sensed signals of the gradient antenna array and omnidirectional antenna array is presented. It may occur to one skilled in the art to combine these signals in other ways as are known or developed in the art including, but not limited to, graphical methods and/or other equation or numeric methods. Such information may also be communicated to the user in various ways, such as the blurred guidance line 1420 of FIG. 14. For example, one potentially advantageous way in which the information from the signal sensed by the gradient and omnidirectional antenna arrays may be communicated to a user is by combining this information into a single indication of the buried utility. By providing the user with a single indication of the utility, rather than separate indications from the gradient and omnidirectional antenna arrays (e.g., such as separate directional arrows and lines), overall ease of use of the locating device may be increased.

Figure 14:
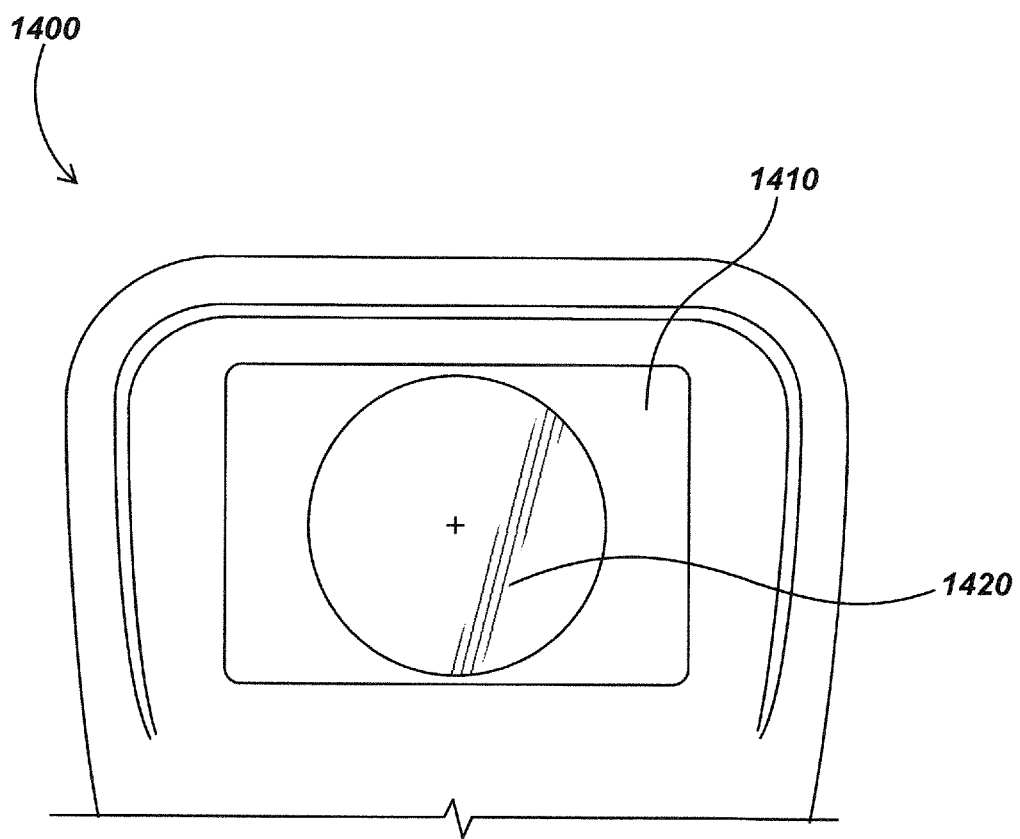
FIG. 14 is a top down view of another graphical user interface embodiment.

In FIG. 14, a locating device embodiment 1400 is illustrated in part which may include a graphical user interface 1410. This GUI may be part of a display module, such as module 150 of locator 100 as shown in FIG. 1. Some embodiments, such as in locating device 1400, may utilize the gradient antenna array and omnidirectional antenna array to continually measure signals, regardless of distance to the utility. In such embodiments, the difference between location and orientation of the utility as sensed by the gradient antenna array versus that sensed by the omnidirectional antenna array may be communicated to the user and/or stored and/or displayed as a metric of uncertainty. For example, in FIG. 14, a blurred guidance line 1420 may be used to graphically illustrate the uncertainty of the sensed location of the utility based on the differences. Other mechanisms for varying the displayed information to provide an indication of uncertainty may also be used in alternate embodiments, such as by using dashed lines, crawling ant lines or other line distortions, line thickness, line coloring or shading, fuzziness, and the like.

Uncertainty may also be caused by distortion of the signal and expressed on the locating device 1400 in a similar manner, either separately or in conjunction with the displayed information associated with differences between antenna arrays as described above. In some embodiments, sensed uncertainty of utility location and/or orientation may include, but is not limited to, widening or narrowing of the guidance line, changing the color and/or shading of the guidance line if used on a color graphical interface, having the line's position vacillate, blurring or fuzzing of the line, dashing or otherwise breaking the displayed line, changing the shape of line segments (e.g., by using small circles, triangles, squares, etc. to illustrate line segments), using a dedicated icon to indicate the uncertainty in degree and/or direction, as well as various other ways in which this information may be effectively communicated to the user as are known or developed in the art.

Figure 15:
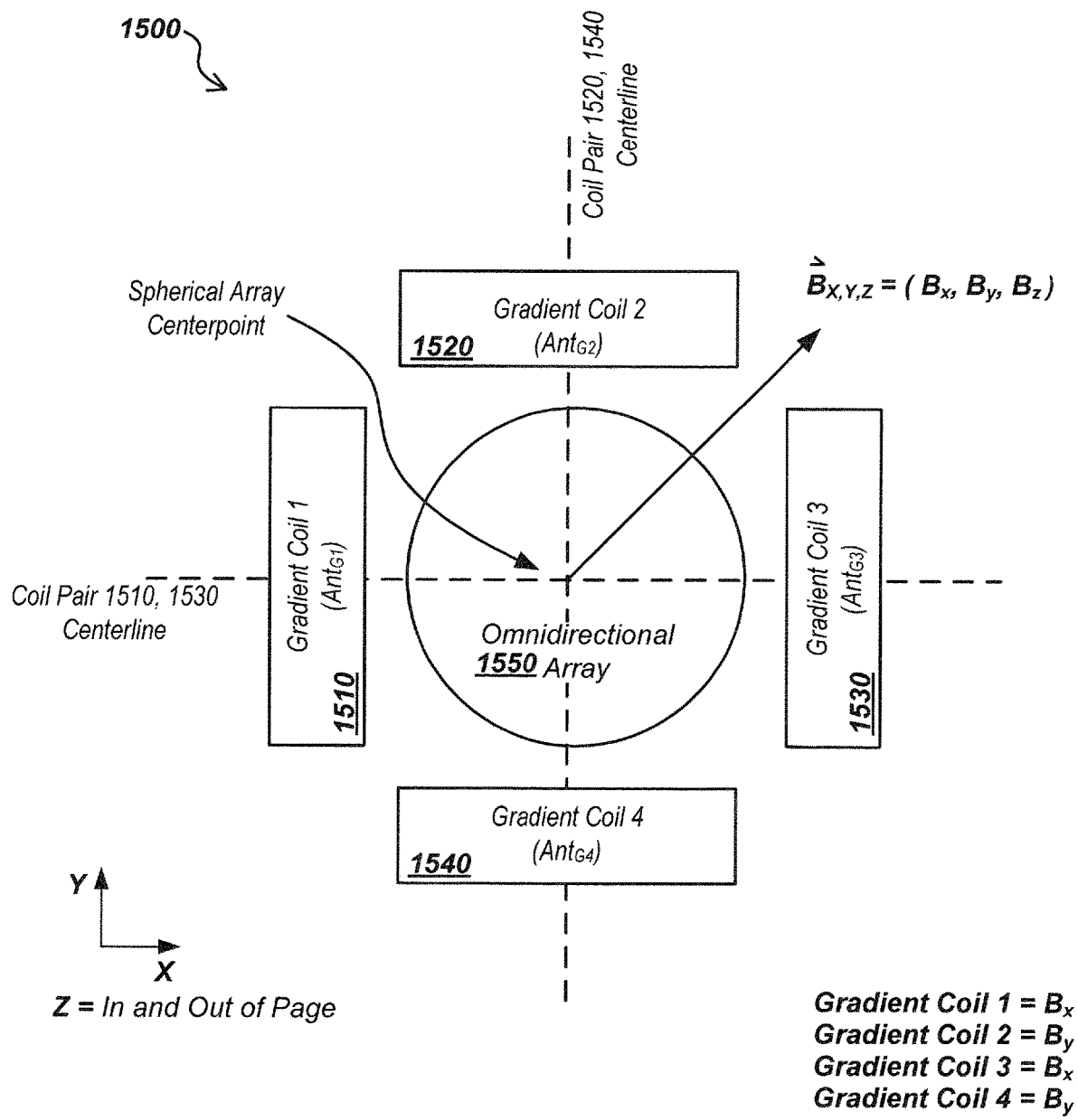
FIG. 15 illustrates details of an embodiment of a locator antenna assembly including an omnidirectional antenna array and a quad gradient antenna array.

FIG. 15 illustrates details of an embodiment of a locator antenna section 1500 including an omnidirectional array element 1550 along with a quad gradient antenna array element including gradient coil pairs 1510, 1530 and 1520, 1540. In an exemplary embodiment, the omnidirectional array 1550 centerpoint may intersect the centerlines of the gradient coil pairs 1510, 1530 and 1520, 1540 as shown. The measured magnetic field vector from omnidirectional array 1550 may be transformed to X, Y, and Z coordinates based on known positions of the three orthogonal coils relative to the gradient coil X and Y dimensions. The resulting magnetic field vector, Bx,y,z may be generated by applying a transformation on the known but arbitrary orientation of the three omnidirectional antenna coil outputs.

In some embodiments, gradients may be determined between each coil and the measured value of the omnidirectional antenna array may be formed. This may be done by continuously converting the three signals from the omnidirectional antenna array in three A/D converters and switching gradient coils sequentially through another A/D converter, while using the B-field vector from the omnidirectional array as an anchor to reference each switched gradient coil to. The omnidirectional array B-field vector may also be used to refine prediction for subsequent digital filter processing. A three point gradient may thusly be made, for example Ex at a first gradient coil 1510 compared to the Ex at the center point of array 1550 and also to Ex measured at a third gradient coil 1530. Additional information on the field shape, curvature, and distortion from a cylindrical field model may thusly be determined.

Figure 16:
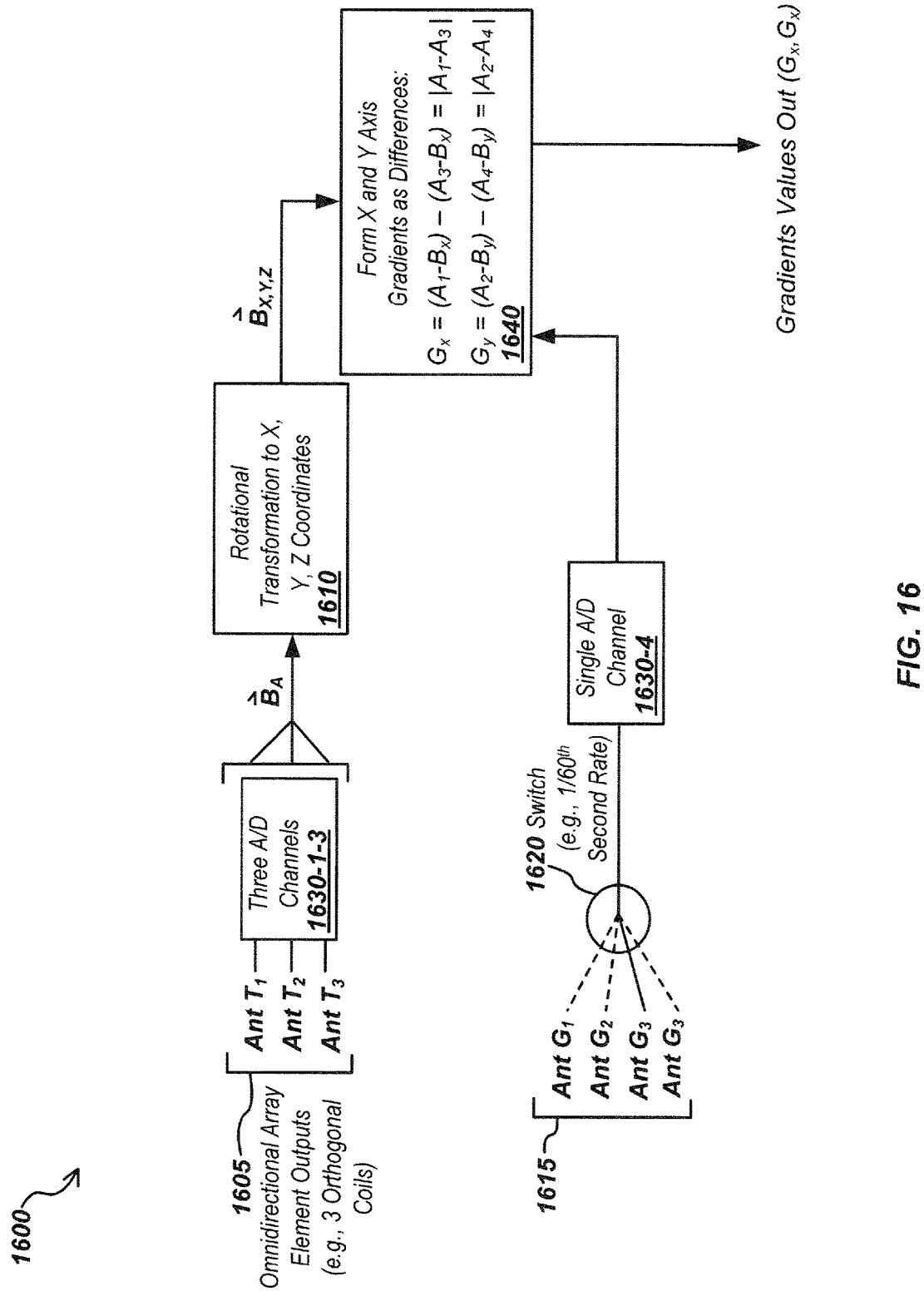
FIG. 16 illustrates details of an embodiment of a switching process for providing antenna signals from an omnidirectional antenna array and a quad gradient antenna array using a quad analog-to-digital converter device.

FIG. 16 illustrates details of an embodiment 1600 of circuitry for processing omnidirectional antenna array signals and gradient pair signals using a quad analog-to-digital (A/D) converter. Omnidirectional array 1605 may generate three orthogonal outputs from antennas T1, T2, and T3 (e.g., three orthogonal coils corresponding to three coils of array 1550 of FIG. 15), with the coil outputs provided to three A/D channels, 1630-1, 1630-2, and 1630-3 of a quad A/D converter 1630, resulting in a digital magnetic field vector, BA, in the coordinates of the omnidirectional array. The vector BA, may be applied to a rotational transformation module 1610, where it may be translated into a vector $B_{X,Y,Z}$ in X, Y, and Z coordinates, with X and Y coordinates corresponding to the plane of the gradient coil pairs.

The remaining quad A/D converter channel 1630-4 may be used to digitize outputs from the four gradient coils (e.g., outputs from antennas G1, G2, G3, and G4 of FIG. 15. A switch 1620 may sequentially switch through the four gradient antenna coils at a predefined time interval, such as at a $\frac{1}{60}$th second or other periodic rate. The rate may be selected based on parameters such as the processing capability of the locator, movement sensitivity of the locator, and/or other locator or operational parameters. The output of A/D converter channel 1630-4 may then be provided to a gradient processing module 1640, which may periodically generate X and Y gradient values based on summation of the rotated omnidirectional signals and switched gradient signals to generate output X and Y gradient values Gx and Gy.

Figure 17:
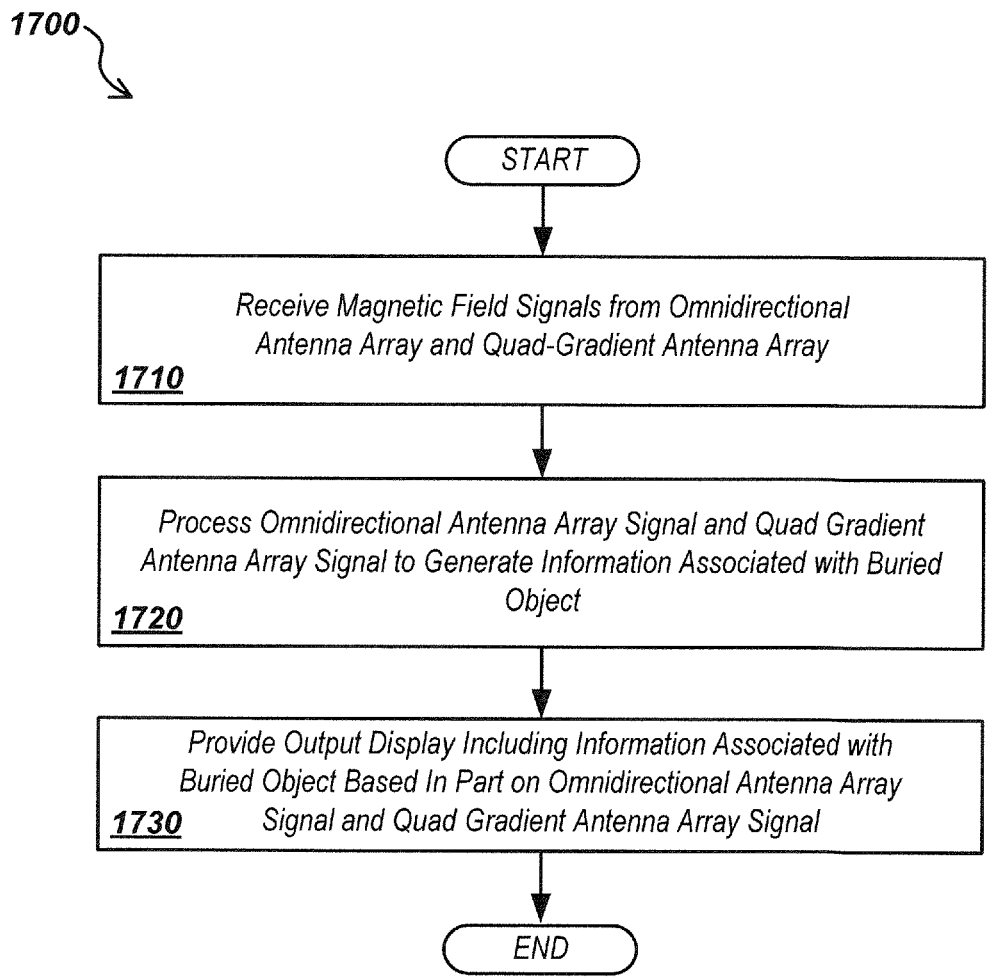
FIG. 17 illustrates details of an embodiment of a process for providing locator display information based in part on signals received from an omnidirectional antenna array and in part from signals received from a quad gradient antenna array.

FIG. 17 illustrates details of an embodiment of a process 1700 for providing a locator display based on information determined from an omnidirectional array and a quad gradient antenna array. At stage 1710, magnetic field signals may be received at a buried object locator at both an omnidirectional antenna array and a quad gradient antenna array. At stage 1720, the received magnetic field signals may be processed, such as in a processing element of the locator, to generate information associated with the buried object. At stage 1730, an output display may be provided on a locator display. The output display may be based in part on the omnidirectional array signal and in part on the quad gradient antenna array signal. For example, in an exemplary embodiment, buried object information may be presented on the display based primarily on the quad gradient antenna array when the locator is positioned close to or directly over the buried object. Conversely, the buried object information may be presented on the display based primarily on the omnidirectional antenna array when the locator is positioned far from or significantly offset from being above the buried object.

Figure 18:
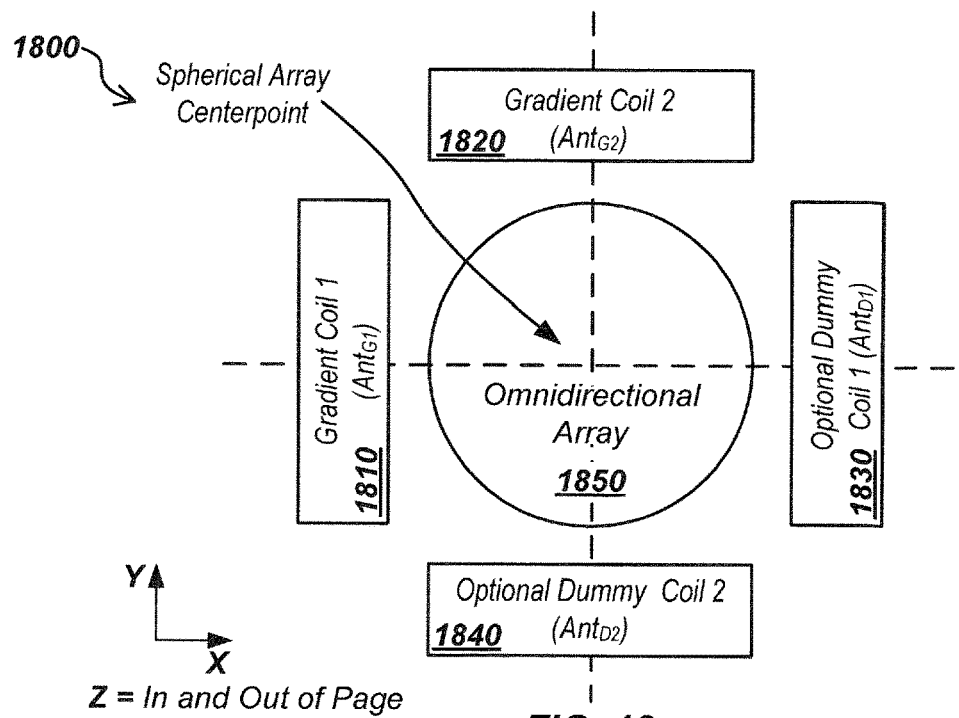
FIG. 18 illustrates details of an embodiment of an antenna node including an omnidirectional antenna array, gradient antenna array coils, and optional dummy coils.
Figure 19:
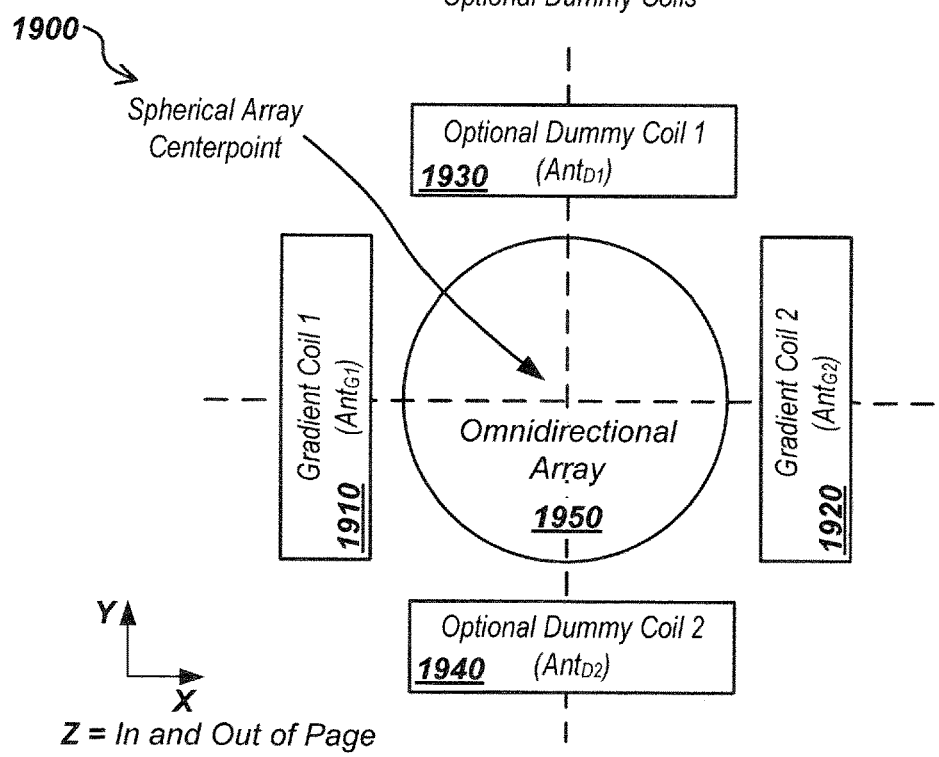
FIG. 19 illustrates details of an alternate embodiment of an antenna node including an omnidirectional antenna array, gradient antenna array coils, and optional dummy coils.

In some embodiments, alternate gradient coil configurations may be used, along with optional dummy coils. For example, the antenna assembly may include three coils configured orthogonally in an omnidirectional ball assembly and two additional coils (of four gradient coil positions) disposed around the enclosure. Examples of this configuration are shown in FIGS. 18 and 19. The two coils may be opposed pairs (FIG. 19) or may be orthogonal single antennas (FIG. 18). Specifically, FIG. 18 illustrates details of an embodiment of an antenna node 1800 including an omnidirectional array element 1850 (e.g., three spheroidal-shaped orthogonal coils) with a gradient array including two orthogonal gradient coils 1810, 1820, and two optional dummy coils 1830 and 1840. FIG. 19 illustrates an alternate embodiment with an omnidirectional array 1950 and paired gradient coils 1910, 1920, along with optional dummy coils 1930 and 1940.

In this configuration, the field strength in the direction of any of the four (or more) coils may be determined from the centrally determined magnetic field vector, and then gradients can be calculated from the center point of the array to any coil placed around the perimeter. This may be done to reduce the total number of processing channels (e.g., in common implementations where analog-to-digital converters are packaged in fours, a pair of four channel A/Ds (e.g., 8 channels) can be configured so that 3 channels are used for an upper orthogonal antenna array, three channels for a lower orthogonal antenna array, and two more channels may be used for gradient antenna coil processing (assuming that no switching is done)) or other purposes.

Optional dummy coils may also be added to this configuration to balance mutual inductance (i.e., current induced in one coil creates a magnetic field that can be measured in the other coil, and vice-versa). In antenna coil configurations such as illustrated herein, coils tend to interact with each other. A single pair of opposed coils may cause more distortion of measured magnetic field as the locator is rotated at a particular location. If other coil positions are populated with dummy coils to load the magnetic field in the same way the active coils do (e.g., connected to preamps and A/Ds), a more accurate measurement may be determined.

The gradient coils and dummy coils may have co-planar axes substantially intersecting the center of the omnidirectional array as described previously herein (e.g., the two coils whose axes are coaxial may intersect the center of the inner triad of the omnidirectional array).

Figure 20A:
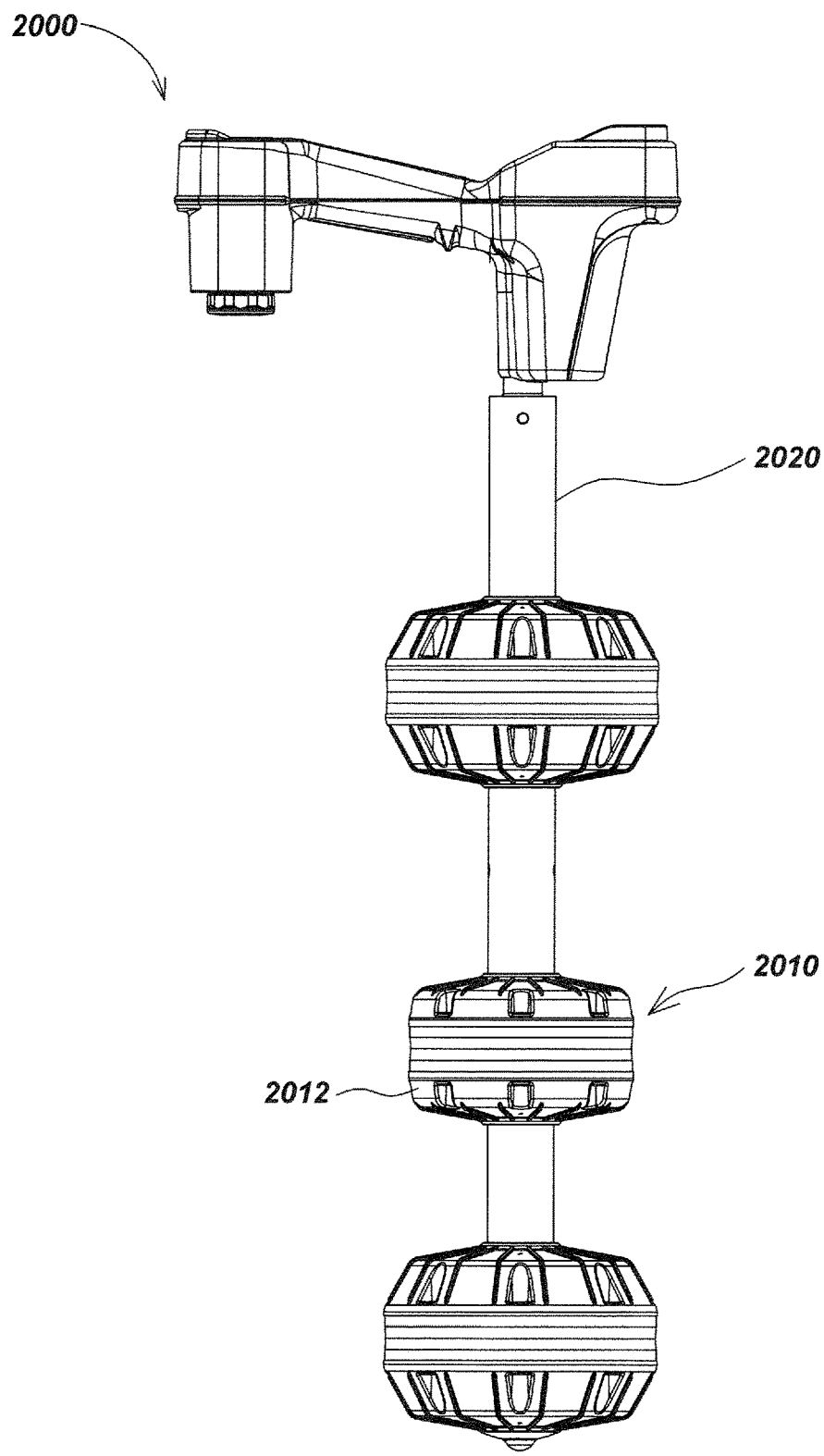
FIG. 20A is an illustration of an alternative embodiment of a buried object locator with an alternative quad-gradient coil antenna node embodiment.

Turning to FIG. 20A, a locating device embodiment 2000 may include a quad-gradient coil antenna node 2010 in accordance with certain aspects of the present disclosure. The antenna node 2010 may include multiple antenna components including a housing 2012 and a plurality of antennas within the housing 2012. Antenna node 2010 may be mounted centrally among an array of other antenna nodes along the locator mast 2020 as shown, or, in some embodiments, may be positioned elsewhere on a locator or similar system.

Figure 20B:
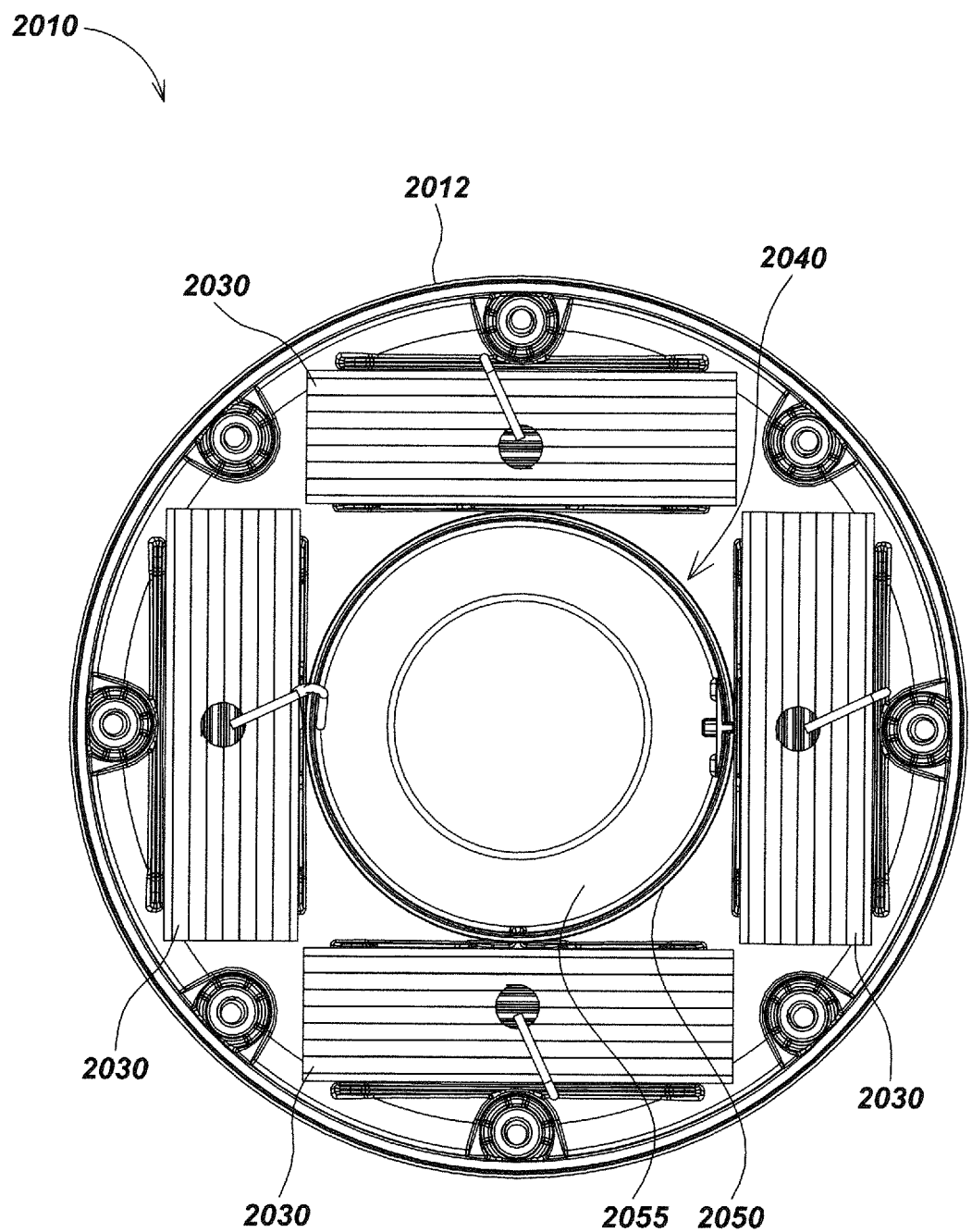
FIG. 20B is a top down view of the quad-gradient coil antenna node embodiment from FIG. 20A with part of the housing removed.
Figure 20C:
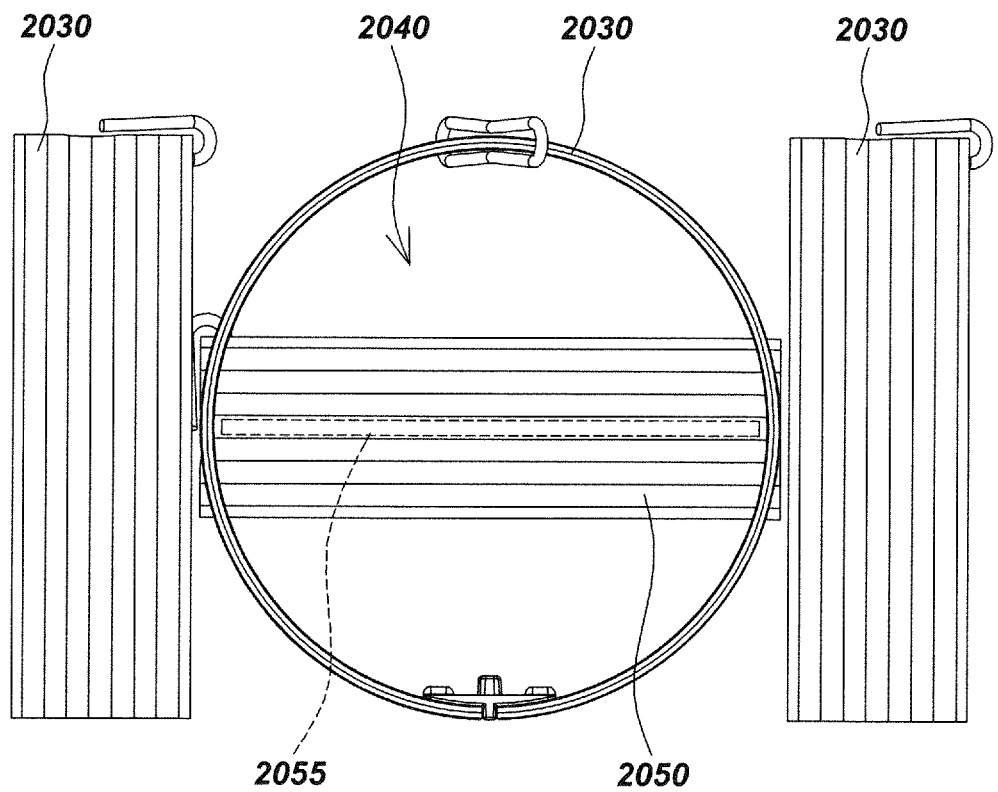
FIG. 20C is a side view of the quad-gradient coil antenna node embodiment from FIG. 20A with the housing removed, illustrating details of a central antenna assembly.

Turning to FIGS. 20B and 20C, the antenna node 2010 may include a gradient antenna array that includes multiple outer antenna coils, such as, for example, four outer antenna coils 2030 as shown, as well as a central antenna assembly 2040 which may include vertical antenna coils, such as, for example, vertical antenna coil 2050 as shown, which may circumscribe a circuit element such as PCB 2055 and/or structural elements or other electronics or mechanical elements. The outer antenna coils 2030 and central antenna assembly 2040 may be nested in the largely cylindrical housing 2012.

Figure 20D:
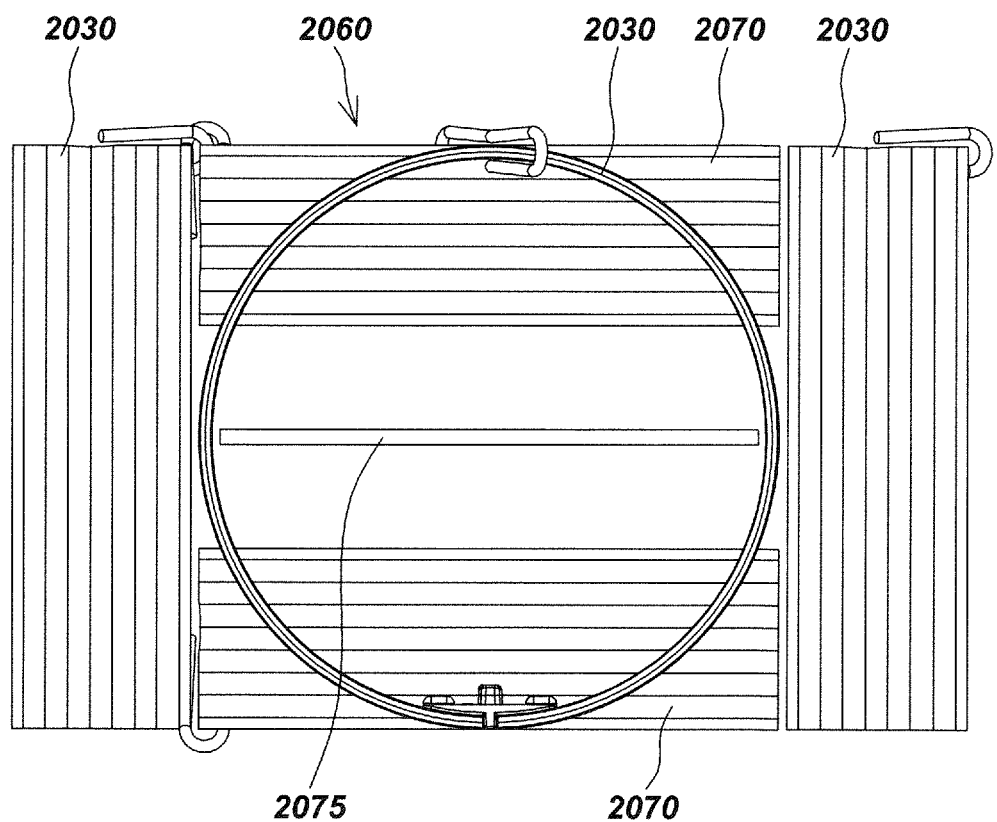
FIG. 20D is a side view of a quad-gradient coil antenna node embodiment illustrating details of an alternative central antenna assembly.

In some alternative embodiments, such as the embodiment illustrated in FIG. 20D, an alternative central antenna assembly 2060 may include multiple vertical antenna coils 2070. A central PCB 2075 may be seated between the vertical antenna coils 2070. The embodiments illustrated in FIGS. 20A-20D may be used simultaneously or separately as either gradient array or as an omnidirectional vector array or alternately switched between the two modes either via hardware or software switches and corresponding processing elements or other electronic control and switching circuits. Some embodiments, such as the one illustrated in antenna array 2010 of FIG. 20A, may be used to further correct buried utility depth estimates as described in, for example, co-assigned U.S. patent application Ser. No. 13/605,960, entitled SYSTEMS AND METHODS FOR LOCATING BURIED OR HIDDEN OBJECTS USING SHEET CURRENT FLOW MODELS, filed Sep. 6, 2012 the content of which is hereby incorporated by reference herein in its entirety. The correction may use a single measured component of the magnetic field, a measurement of an X-Y projection of the field, or by determining the full vector of the field being sensed.

Figure 21:
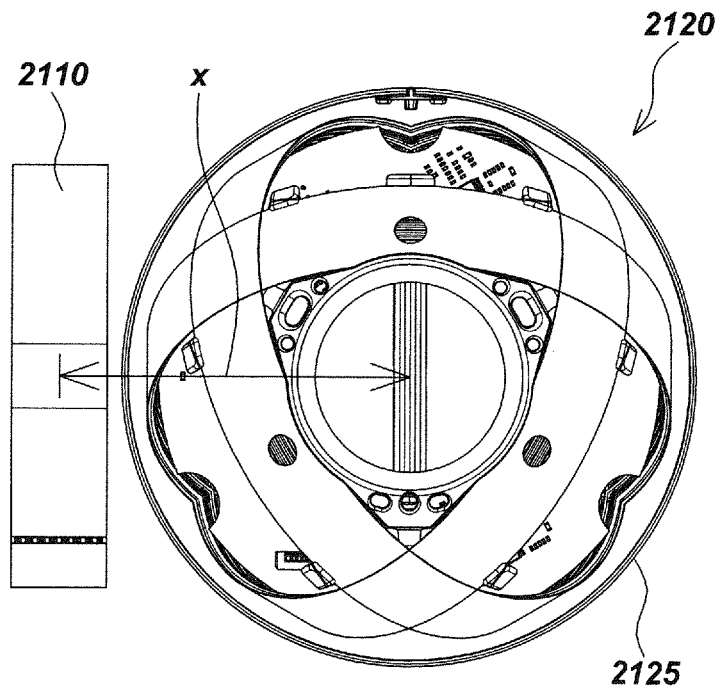
FIG. 21 is a top view of an embodiment with a single gradient antenna coil.

As illustrated in FIG. 21, a single gradient antenna coil 2110 may be used in some embodiments. The single gradient antenna coil 2110 may be secured about a central antenna coil air array such as the omnidirectional antenna coil array 2120. An equatorial coil 2125 may also secure horizontally about the omnidirectional antenna coil array 2120.

Figure 22:
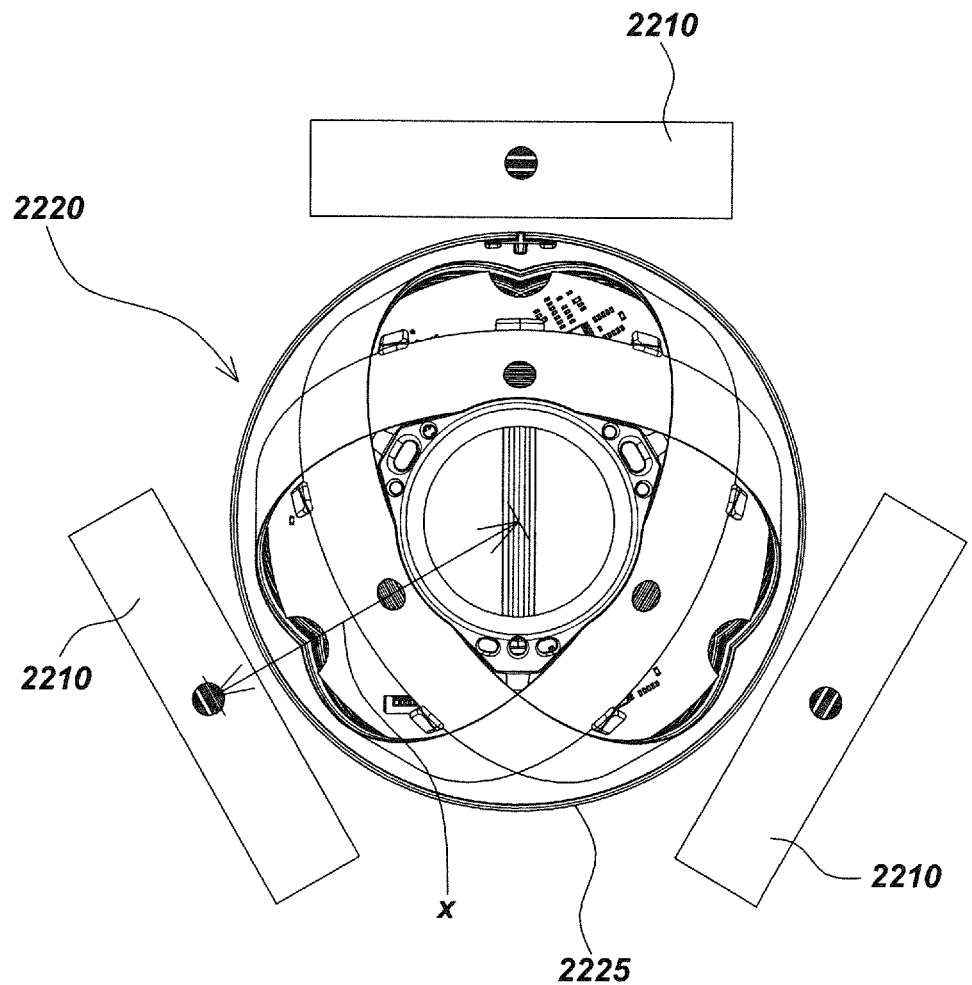
FIG. 22 is a top view of an embodiment with three gradient antenna coils.

As illustrated in FIG. 22, three gradient coils 2210 may be used in some embodiments. The three gradient coils 2210 may be secured about a central antenna coil array such as the omnidirectional antenna array 2220. An equatorial coil 2225 may also secure horizontally about the omnidirectional antenna coil array 2220. Some embodiments with odd numbers of gradient antenna coils, such as the embodiment illustrated in FIG. 22, may be implemented without a diametrically opposite gradient antenna coil. In other embodiments, different odd numbers of gradient antenna coils besides the three gradient antenna coils 2210 illustrated in FIG. 22 may also be used.

Figure 23:
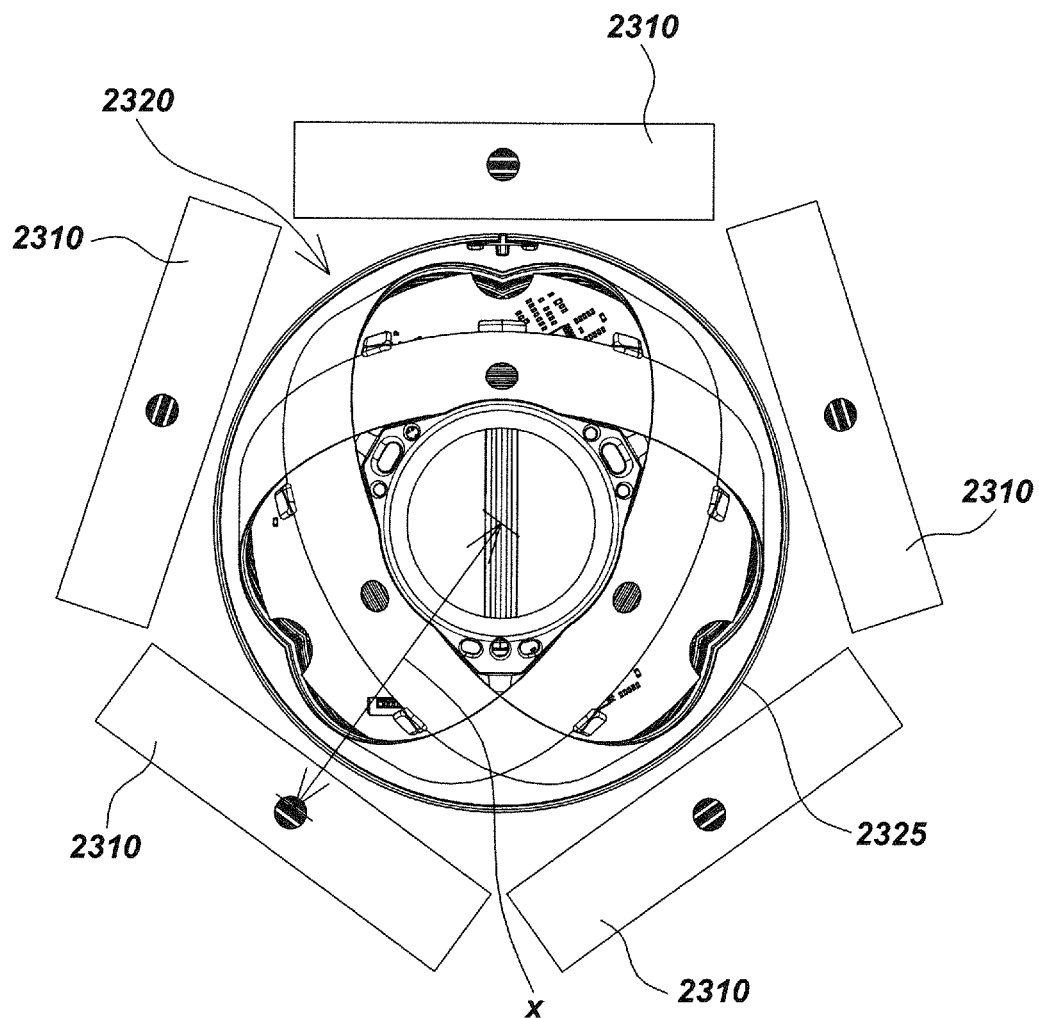
FIG. 23 is a top view of an embodiment with five gradient antenna coils.

As illustrated in FIG. 23, five gradient antenna coils 2310 may be used in some embodiments. The five gradient antenna coils 2310 may be secured about a central antenna coil array such as the omnidirectional antenna coil array 2320. An equatorial coil 2325 may also secure horizontally about the omnidirectional antenna coil array 2320.

Figure 24:
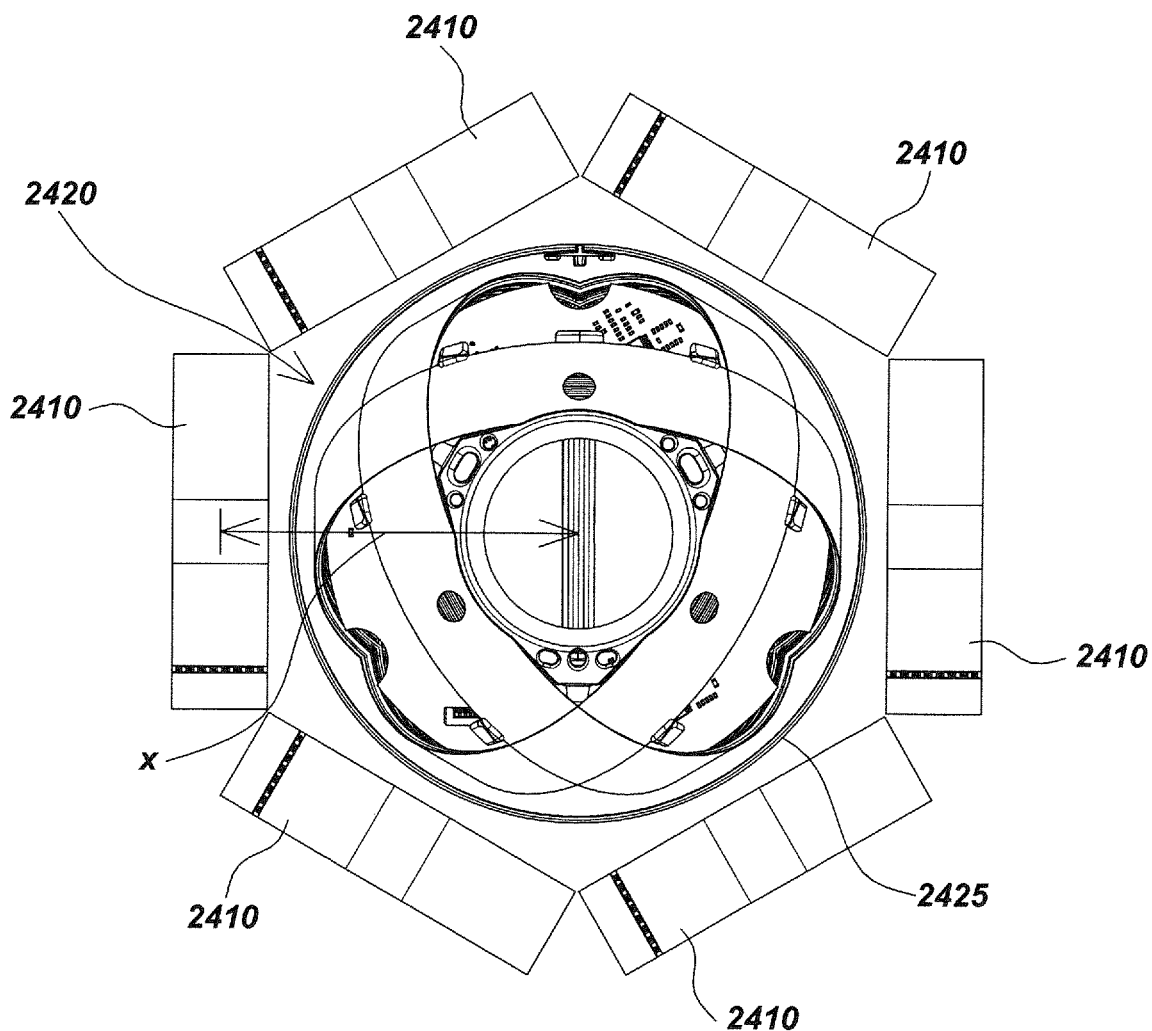
FIG. 24 is a top view of an embodiment with six gradient antenna coils.
Figure 25:
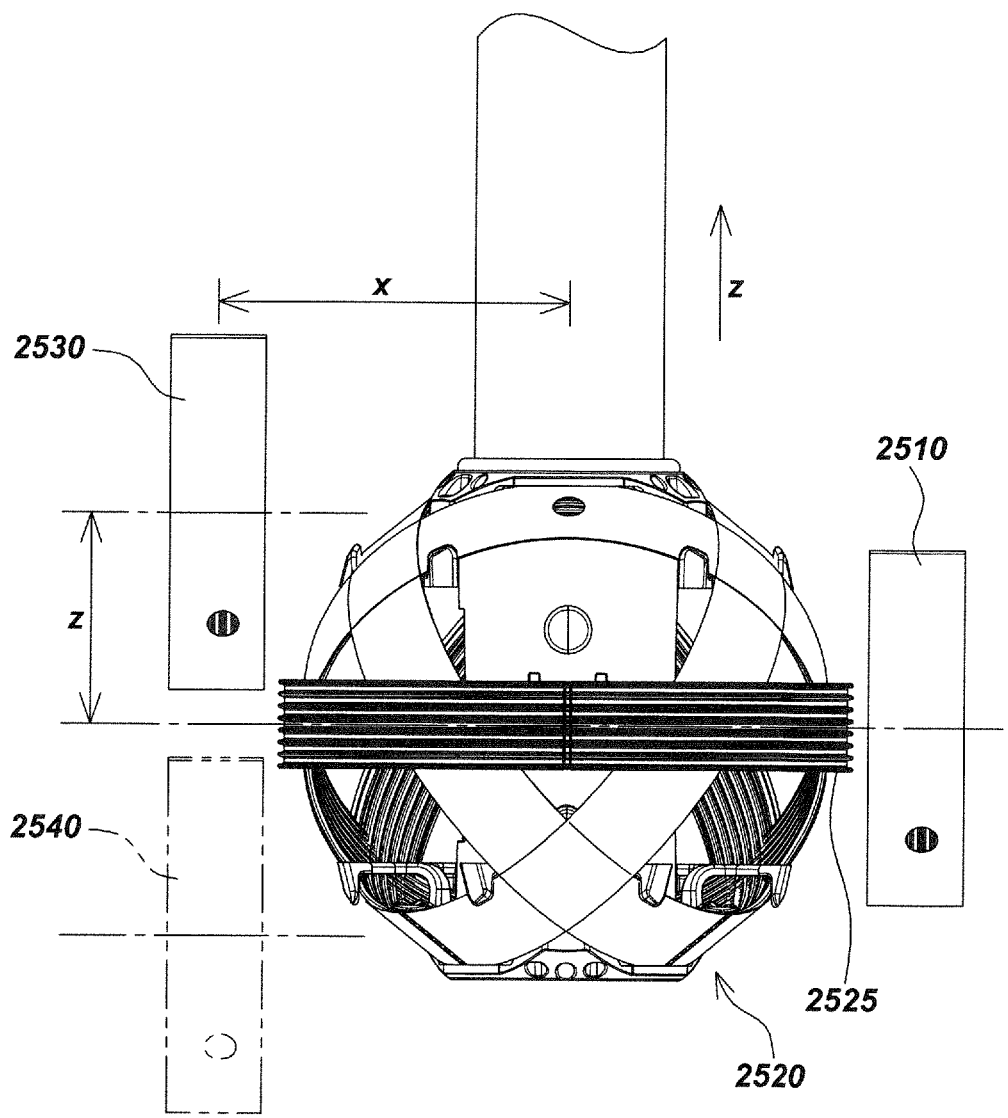
FIG. 25 is an illustration of an embodiment having gradient antenna coils located offset from the horizontal plane intersecting the center point of an omnidirectional antenna ball.
Figure 26A:
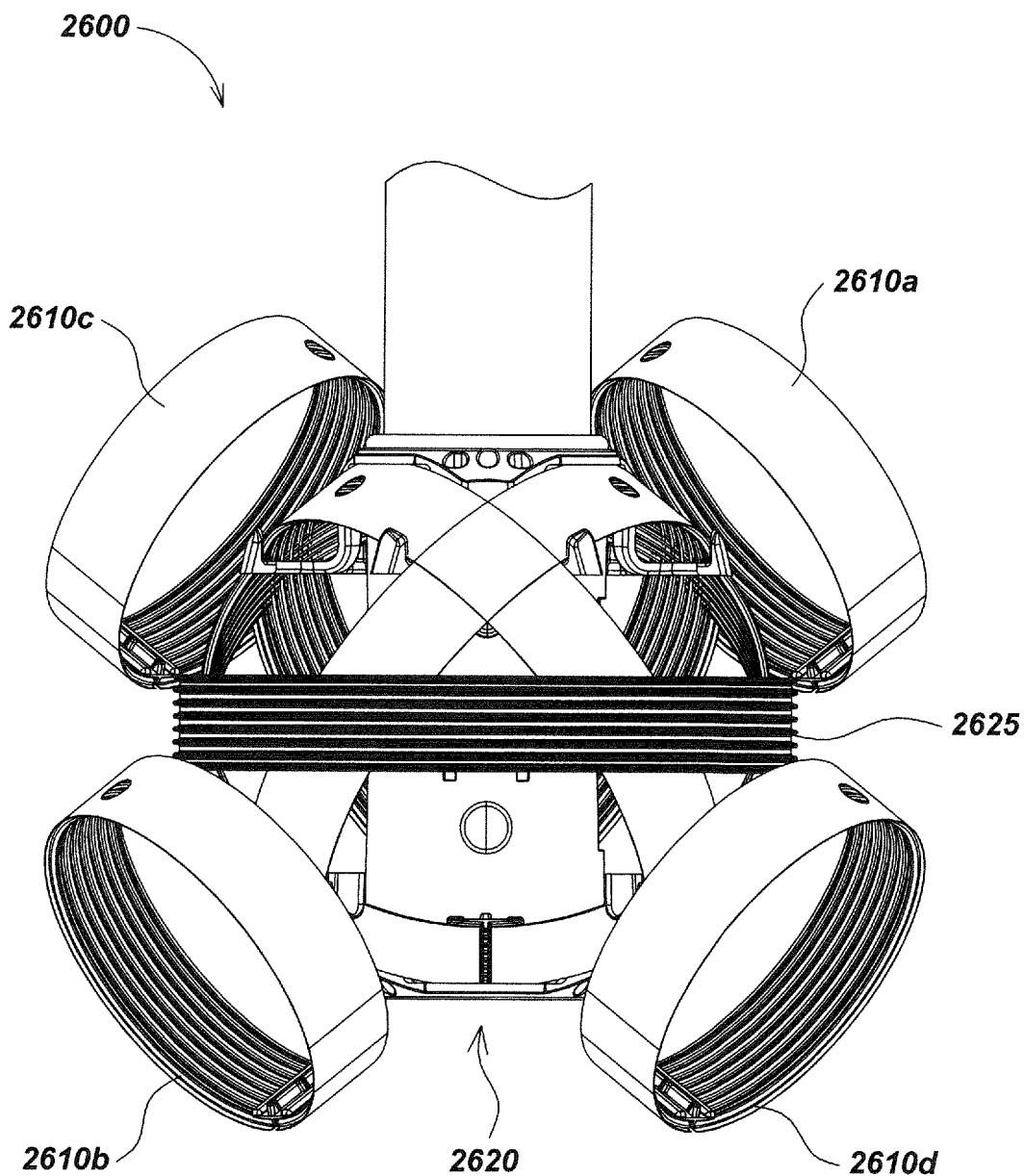
FIG. 26A is a side view illustration of an alternative gradient coil configuration embodiment.
Figure 26B:
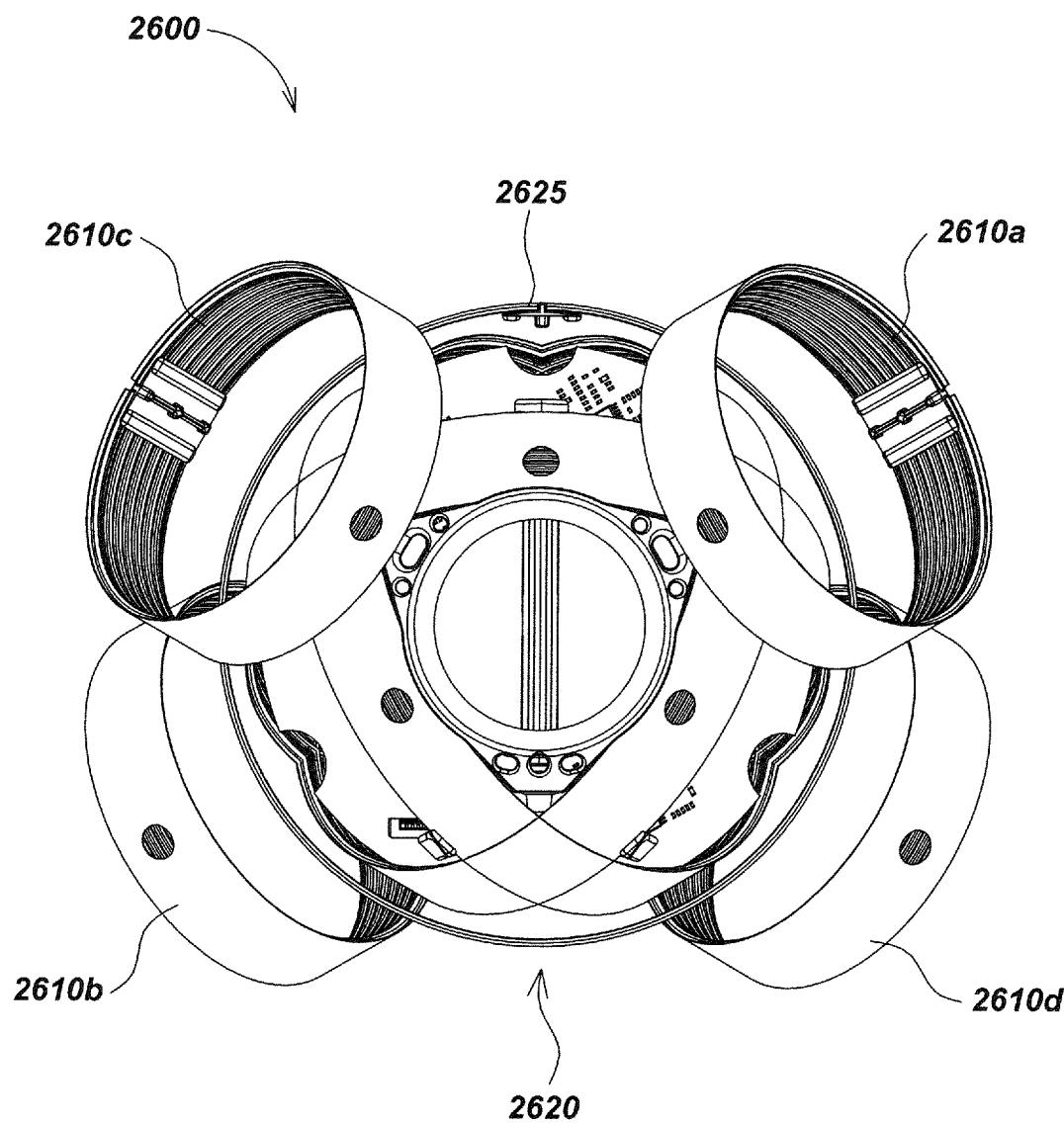
FIG. 26B is a top view of the configuration from FIG. 26A.
Figure 27A:
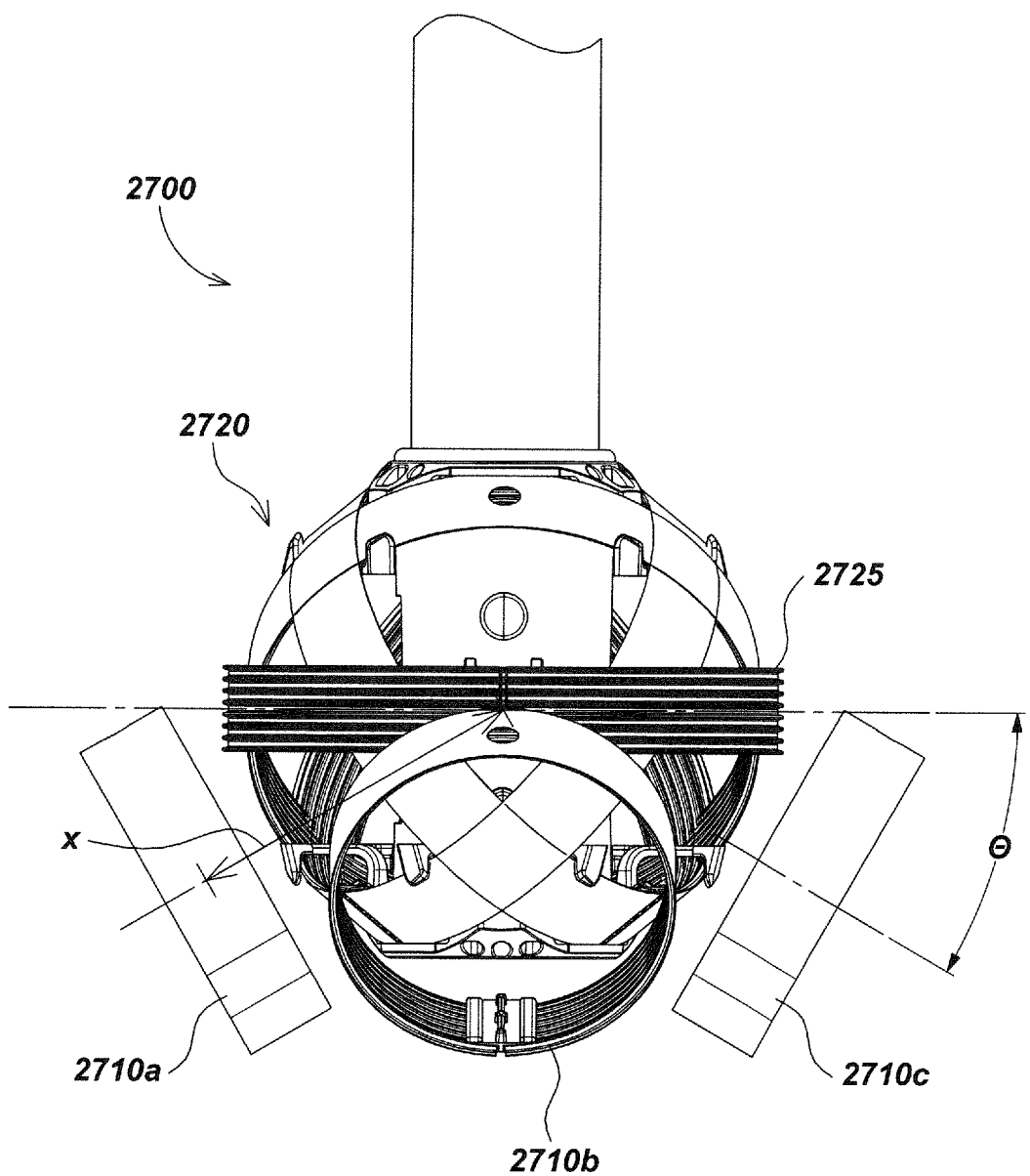
FIG. 27A is a side view illustration of an alternative gradient coil configuration embodiment.
Figure 27B:
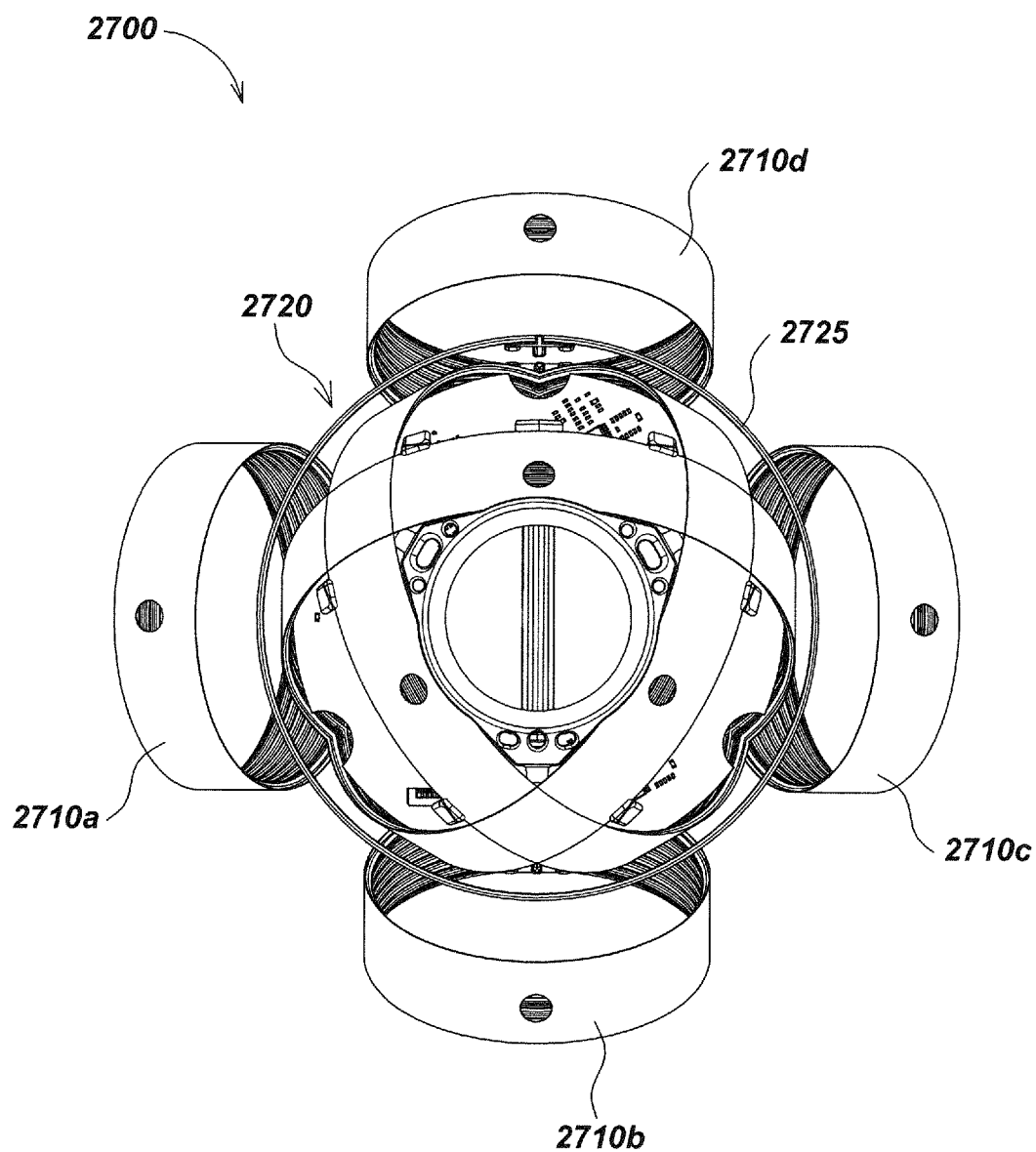
FIG. 27B is a top view of the configuration from FIG. 27A.

As illustrated in FIG. 24, six gradient antenna coils 2410 may be used in some embodiments. The six gradient antenna coils 2410, providing three sets of diametrically paired gradient antenna coils, may be secured about a central antenna coil array such as the omnidirectional antenna coil array 2420. An equatorial coil 2425 may also secure horizontally about the omnidirectional antenna coil array 2420. In other embodiments, any number of gradient antenna coils may be used oriented in any number of combinations.

In some embodiments, gradient antenna coils may be positioned such that the horizontal plane containing the central axis of the embodiment's gradient antenna coils may never intersect the center point of the central antenna coil array. For instance, the central x-axis of the gradient coil 2510 of FIG. 25 and the center of the omnidirectional antenna array 2520 may share the same horizontal plane. In contrast, the offset gradient coil 2530 may be positioned higher along the 'z' or vertical axis than the gradient coil 2510. As such, the horizontal plane containing the central axis of the offset gradient coil 2530 does not intersect the center of the omnidirectional antenna array 2520. In some embodiments, gradient antenna coils may be located in various positions along the 'z' or vertical axis such as the offset gradient coil position 2540. In yet other embodiments, gradient coils may be offset along the horizontal and/or vertical axes.

As illustrated in FIGS. 26A-27B, gradient coils may be positioned in various configurations around the central omnidirectional antenna array. In some embodiments, the gradient antenna coils may be configured to be tilted above or below the plane of the center point of the omnidirectional antenna array in any combination. As illustrated in embodiment 2600 in FIGS. 26A and 26B, for instance, some gradient coils, such as the gradient coils 2610a and 2610c, may be tilted upward above the plane of the center point of the omnidirectional antenna array 2620 while diametrically paired gradient coils, such as the gradient coils 2610b and 2610d, may be tilted below the plane of the center point of the omnidirectional antenna array 2620. In other embodiments, the gradient coils need not have a diametrically paired gradient coil. Some embodiments, such as the embodiments 2700, all gradient coils, such as the gradient coils 2710a-d, may be tilted in a similar fashion below the plane of the center point of the omnidirectional antenna array 2720. The gradient coils of an alternative embodiment in keeping with the present disclosure may include coils oriented, offset, or otherwise positioned in any arrangement about a central omnidirectional antenna array.

In any embodiment in keeping with the present disclosure, an antenna coil or set of coils may be used as excitation, broadcast, and/or induction coils.

While we have described and illustrated various exemplary embodiments of antenna arrays and related elements for use in locator systems, modifications and adaptations of the embodiments described herein will be apparent to persons skilled in the art. For example, antenna array elements, such as omnidirectional arrays and gradient arrays may include fewer than or more antenna elements, such as coils, than shown. Furthermore, other shapes, sizes, magnetic field orientations, and configurations of coils and array configurations may also be used within various locator implementations.

In some configurations, the antenna nodes or arrays and methods, or systems described herein may include means for implementing features or providing functions described herein, such as means for generating, receiving, processing, storing, and/or outputting magnetic sensor signals from antenna coils, and generating corresponding output signals suitable for further processing, display, and/or storage in a locator system In one aspect, the aforementioned means may be a module or assembly including a processor or processors, associated memory and/or other electronics in which embodiments of the invention reside, such as to implement the various aspects and functions as described herein. These may be, for example, modules or apparatus residing in antenna nodes, processing and display modules, in hardware or software, and/or in other electronic devices or systems.

In one or more exemplary embodiments, the electronic functions, methods and processes described herein and associated with antenna signal processing and display functions may be implemented in hardware, software, firmware, or any combination thereof. If implemented in software, the functions may be stored on or encoded as one or more instructions or code on a computer-readable medium that may be executed by a processing or other programmable device. Computer-readable media includes computer storage media. Storage media may be any available media that can be accessed by a computer processor or processors. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes, methods, and flowcharts disclosed herein are examples of exemplary approaches. Based upon design preferences, it is understood that the specific order or hierarchy of steps in the processes may be rearranged while remaining within the scope of the present disclosure.

Those of skill in the art would understand that information and signals, such as RF signals, control signals, command signals, output signals, display signals, or other signals or data may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Signals may be formatted in accordance with definitions and specifications defining such signals, such as serial interface signals such as USB® signals, Firewire® signals, or other currently defined signaling formats or signaling formats later-developed in the art.

Those of skill would further appreciate that the various illustrative logical blocks, modules, circuits, and algorithm steps described in connection with the embodiments disclosed herein may be implemented as electronic hardware, computer software, electro-mechanical components, or combinations thereof. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative functions and circuits described in connection with the embodiments disclosed herein may be implemented or performed in a processing element or elements with, for example, a general purpose processor, a digital signal processor (DSP), an application specific integrated circuit (ASIC), a field programmable gate array (FPGA) or other programmable logic device, discrete gate or transistor logic, discrete hardware components, memory devices, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, memory devices, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Various modifications to the embodiments described herein will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein and/or illustrated in the accompanying Drawings.

It is noted that reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the presently claimed invention is not intended to be limited to the aspects shown herein but is to be accorded the widest scope consistent with the appended Claims and their equivalents.

We claim:

1. A buried utility locator, comprising:
   a mast;
   a housing mechanically coupled to the mast;
   a processing element disposed in the housing;
   a display element disposed on or within the housing;
   an antenna node coupled to the mast, the antenna node comprising:
   an omnidirectional antenna array;
   a gradient antenna array including four or more gradient antenna coils; and
   a processing element having inputs from corresponding outputs of the omnidirectional antenna array in three orthogonal dimensions and outputs of the coils of the gradient antenna array, wherein the processing element is programmed to determine information about the buried utility based on the omnidirectional antenna array outputs and the gradient antenna array outputs.

2. The buried utility locator of claim 1, further including a display element for providing a visual display of the determined information to a user of the buried utility locator.

3. A method of providing buried utility information with a buried utility locator including an omnidirectional antenna array and a gradient antenna array, the method comprising:

receiving a magnetic field signal emitted from a buried utility at the omnidirectional antenna array and providing output signals corresponding to magnetic field signals received in three orthogonal directions;

receiving the magnetic field signal emitted from the buried utility at the gradient antenna array and providing output signals corresponding to magnetic field signals received at the four or more gradient antenna coils;

processing the output signals from omnidirectional antenna array and the gradient antenna array in a processing element of the buried utility locator to determine information about the buried utility, wherein the determined information about the buried utility is based on the omnidirectional antenna array signals and the gradient antenna array signals; and storing the determined information in a non-transitory memory of the buried utility locator.

4. The method of claim 3, further comprising providing a visual display on the buried utility locator of the determined information.

\* \* \* \* \*